(12) United States Patent
Taniguchi et al.

(10) Patent No.: US 7,212,989 B1
(45) Date of Patent: May 1, 2007

(54) VEHICLE-MOUNTED COMMUNICATION DEVICE AND ROAD-TO-VEHICLE COMMUNICATION DEVICE

(75) Inventors: Shinichi Taniguchi, Aichi-ken (JP); Kazumasa Nakamura, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/362,982
(22) Filed: Jul. 30, 1999

Related U.S. Application Data

(63) Continuation-in-part of application No. PCT/JP98/00342, filed on Jan. 28, 1998.

(30) Foreign Application Priority Data

Jan. 31, 1997 (JP) .................................. 9-019412
Feb. 4, 1997 (JP) .................................. 9-021591

(51) Int. Cl.
G07B 15/00 (2006.01)
G07B 15/02 (2006.01)
G06Q 99/00 (2006.01)

(52) U.S. Cl. .............................. 705/13; 705/1; 705/16; 340/905; 701/117; 701/210

(58) Field of Classification Search ................ 705/1, 705/500, 13, 16; 340/989, 468, 905; 455/558, 455/457; 701/117, 41, 210; 235/384
See application file for complete search history.

(56) References Cited

U.S. PATENT DOCUMENTS 5,434,841 A * 7/1995 Nishikawa .................. 369/121

(Continued)

FOREIGN PATENT DOCUMENTS

JP    5-266393    10/1993

(Continued)

OTHER PUBLICATIONS

Yamao, Y; Nakajima, N; Ohmori, S; The Future Generations of Mobile Communications Based on Broadband Access Technologies (IEEE Communications Magazine, Dec. 2000).*

*Primary Examiner*—Andrew J. Fischer
*Assistant Examiner*—C Owen Sherr
(74) *Attorney, Agent, or Firm*—Buchanan Ingersoll & Rooney PC

(57) ABSTRACT

A vehicle-mounted communication device and a road-to-vehicle communication device are provided which each allow communication of information using a simple structure by making leakage of information difficult. Information including encryption information is communicated between an on-road apparatus 10 having a memory 28 in which an electronic key A is stored, and a vehicle-mounted apparatus 30 having a storage circuit 48. Encrypted route information and the like are stored as is in the vehicle-mounted apparatus 30. Encryption and decoding are executed at an on-road apparatus side. In reception of charges, encrypted information from an IC card 62 having a memory 70 in which a security mechanism is stored passes through the vehicle-mounted apparatus and is transferred to the on-road apparatus. The encrypted information from the IC card 62 is decoded with the on-road apparatus. Accordingly, the encrypted information is mutually transferred between these apparatuses and the vehicle-mounted apparatus does not require encryption or decoding. As a result, the security of a system can be improved.

7 Claims, 21 Drawing Sheets

U.S. PATENT DOCUMENTS

| | | | |
|---|---|---|---|
| 5,451,758 A * | 9/1995 | Jesadanont | 23/384 |
| 5,485,520 A * | 1/1996 | Chaum et al. | 705/74 |
| 5,554,984 A * | 9/1996 | Shigenaga et al. | 340/937 |
| 5,602,919 A * | 2/1997 | Hurta et al. | 705/65 |
| 5,631,642 A * | 5/1997 | Brocklesby et al. | 340/993 |
| 5,913,175 A * | 6/1999 | Pinault | 455/558 |
| 5,926,546 A * | 7/1999 | Maeda et al. | 705/65 |
| 5,963,129 A * | 10/1999 | Warner | 340/468 |
| 6,019,285 A * | 2/2000 | Isobe et al. | 235/384 |
| 6,078,888 A * | 6/2000 | Johnson, Jr. | 705/1 |
| 6,088,680 A * | 7/2000 | Hoshino et al. | 705/13 |
| 6,154,658 A * | 11/2000 | Caci | 455/466 |
| 6,199,045 B1 * | 3/2001 | Giniger et al. | 705/1 |
| 6,282,493 B1 * | 8/2001 | Kitagawa et al. | 701/211 |

FOREIGN PATENT DOCUMENTS

| | | | |
|---|---|---|---|
| JP | 6-60237 | | 3/1994 |
| JP | 6-511097 | | 12/1994 |
| JP | 8-7139 | | 1/1996 |
| JP | 8-212400 | | 8/1996 |
| JP | 8-221624 | | 8/1996 |
| JP | 8-305908 | | 11/1996 |
| JP | 10-134214 | | 5/1998 |
| WO | WO98/34198 | * | 1/1998 |
| WO | PCT/JP98/00342 | * | 10/1998 |

* cited by examiner

PROCESS OF INFORMATION WRITING DEVICE

PROCESS OF VEHICLE-MOUNTED APPARATUS

VEHICLE-MOUNTED COMMUNICATION DEVICE AND ROAD-TO-VEHICLE COMMUNICATION DEVICE

This application is a continuation, of Application No. PCT/JP98/00342, filed in Japan on Jan. 28, 1998, and which designated the U.S.A.

TECHNICAL FIELD

The present invention relates to a vehicle-mounted communication device and a road-to-vehicle communication device, and particularly to a vehicle-mounted communication device mounted on a vehicle and to a road-to-vehicle communication device which effects communication processing between the vehicle-mounted communication device and an on-road apparatus installed on a road side.

BACKGROUND ART

In recent years, an automatic toll collecting system has been developed which utilizes a toll pre-paid type card or a toll post-payment type card to receive charges for using charged facilities, for example, to receive a toll charged on a toll road. In the automatic toll collecting system, on-road apparatuses for road-to-vehicle communications (hereinafter referred to as "on-road apparatuses") with antennas, each of which serves as an interrogator for making inquiries with respect to a vehicle for information in order to collect tolls automatically at entrance and exit gates of the toll road, are provided on the road side, and each of vehicle-mounted apparatuses for road-to-vehicle communications communications (hereinafter referred to as "vehicle-mounted apparatuses") with antennas, each of which serves as a responder for responding to the information, with respect to which an inquiry was made is mounted on the vehicle, whereby the information is transferred by radio communications between the vehicle-mounted apparatus and the on-road apparatus.

In order to transfer the information between the vehicle-mounted apparatus and the on-road apparatus, toll information or vehicle information about a vehicle, and information about a user must be stored. For this reason, an IC card in which a large quantity of data can be stored may be used with information being written therein.

However, as described above, when the information is transferred between the vehicle-mounted apparatus and the on-road apparatus or when the information is transferred to and received from the IC card, the information is used with a form thereof left unchanged. As a result, there exists a problem that a person not intended by a user can easily disclose contents of the information.

Accordingly, there has been proposed an electronic identification system in which secrecy is kept by identifying that a transmitted secret code such as an inherent code coincides with at least one of a plurality of predetermined secret codes, thereby resulting in improvement of security (see Japanese Patent Application Laid-Open (JP-A) No. 6-511097).

However, in a conventional electronic identification system, only one kind of secret code is assigned to a user, and therefore, secret codes must be set correspondingly to the number of users so as to identify a great number of users. For this reason, in a road-to-vehicle communication device in which information is transferred to and received from each of a great number of users, the load on the device increases. Further, only one kind of secret code is assigned to a user, and therefore, when the secret code leaks out, the security of a system used by the user, namely, of the road-to-vehicle communication device, deteriorates.

Further, in order to collect a toll automatically by transferring information between the vehicle-mounted apparatus and the on-road apparatus, vehicle information about a vehicle and user information about a user, such as a balance of charges for accounting must be stored. Accordingly, the IC card in which a large quantity of data can be stored may be used with information being written therein.

However, in a case of transferring the above-described information, when the information is used in a general description form, there exists a problem that a person that is not intended by a user or an information provider can illegally alter or falsify the contents of the information and can also unlawfully utilize such information.

Accordingly, there has been proposed an automatic toll collecting system in which information communicated between an on-road apparatus and a vehicle-mounted apparatus is encoded so as to improve the security (see Japanese Patent Application Laid-Open (JP-A) No. 6-60237). In this system, encoded information stored in an IC card or encoded information from the on-road apparatus is made into a common sentence structure (made into a general descriptive form) in the vehicle-mounted apparatus, and processing for user information such as a balance of charges is effected.

However, in the conventional automatic toll collecting system, the user information made into a common sentence structure in the vehicle-mounted apparatus is temporarily stored. Accordingly, a person that is not intended by the user or the information provider can easily falsify the contents of the user information about a user such as the balance of charges, and the like, thereby resulting in deterioration of security.

SUMMARY OF THE INVENTION

In view of the above-described circumstances, an object of the present invention is to provide a vehicle-mounted communication device and a road-to-vehicle communication device, that can improve security using a simple structure and in a simple manner.

In addition to the above-described object, an object of the present invention is to provide a vehicle-mounted communication device and a road-to-vehicle communication device that can allow communication of information using a simple structure by making it difficult to leak or falsify information.

In order to achieve the above-described objects, a vehicle-mounted communication device comprises: transmitting/receiving means provided for communication of information with road-side communication means located at a road side; and relay means for relaying encryption information received from the road side by the transmitting/receiving means to an IC card which includes storage means for storing user information regarding a balance of charges and which also includes encryption means encrypts and outputs output information based on the user information and decodes encrypted input information regarding the user information.

The invention is a vehicle-mounted communication device as described above, wherein the relay means relays the output information encrypted by the IC card to the transmitting/receiving means.

The invention is a vehicle-mounted communication device as described above, further comprising encryption information storage means in which the encryption information is temporarily stored, wherein the transmitting/receiving means stores the encryption information in the encryption information storage means and transmits as is the encryption information stored in the encryption information storage means.

The invention is a vehicle-mounted communication device as described above, wherein at least one of the IC card and the road-side communication means outputs a portion of the output information in a state without encryption and information display means for displaying the portion of the output information outputted without being encrypted is further provided.

The invention is a road-to-vehicle communication device comprising: a vehicle-mounted communication device as described above, and road-side control means being located at a road side, including road-side communication means and provided for intercommunication of information with the vehicle-mounted communication device, and also including road-side encryption means for encrypting transmitted information and decoding received information.

The invention is a road-to-vehicle communication device as described above, wherein road-side encryption means of the road-side control means installed at an entrance gate effects encryption of transmitted information and road-side encryption means of the road-side control means installed at a toll reception gate effects only decoding of received information.

The invention is a road-to-vehicle communication device as descibed above, wherein the transmitted information is accounting information regarding accounting processing of charged facilities.

The invention is a road-to-vehicle communication device comprising: road-side control means being located at a road side, including road-side communication means and provided for intercommunication of information with vehicle-mounted communication means, and also including first encryption means for encrypting transmitted information, and decoding received information with a first electronic key; information control means including information transfer means which stores therein user information regarding at least one of a vehicle and a user and through which information is mutually transferred with respect to the vehicle-mounted communication means, and also including second encryption means for encrypting output information, and decoding input information with a second electronic key; and vehicle-mounted control means being installed on a vehicle side, including vehicle-mounted communication means provided for intercommunication of information with respect to the road-side communication device and for mutual transfer of information with respect to the information control means, and also including third encryption means which, during the communication of information, encrypts transmitted information and decodes received information with the first electronic key, and which during the transfer of information, encrypts output information and decodes input information with the second electronic key.

The invention of claim 9 is a road-to-vehicle communication device according to claim 8, wherein each group of the first encryption means and the road-side communication means, the second encryption means and the information transfer means, and the third encryption means and the vehicle-mounted communication means are provided on the same substrate.

At the vehicle-mounted communication device intercommunication of information is carried out with respect to the road-side communication means located at the road side, with the transmitting/receiving means. The IC card is attachable and detachable at the vehicle-mounted communication device and stores in the storage means the user information regarding the balance of charges. The encryption means encrypts output information based on the user information and then outputs. The encryption means also decodes the encrypted input information regarding the user information. Among the information received from the road side by the transmitting/receiving means, the encryption information is relayed to the IC card by the relay means. Accordingly, the encryption information passes through the vehicle-mounted communication device in a form of being left unchanged, and thus, the secrecy of the encryption information is maintained and the security thereof is protected.

As described above, the above-described relay means relays the output information encrypted by the IC card to the transmitting/receiving means, so as to transmit the output information based on the encrypted user information from the IC card to the road side in a form of being left unchanged. As a result, the secrecy of the output information can be maintained and the security thereof can be protected.

As described above, the vehicle-mounted communication device can further include the encryption information storage means in which encryption information is temporarily stored. The encryption information storage means stores therein encryption information with the transmitting/receiving means. Further, the stored encryption information is transmitted as is by the transmitting/receiving means. As a result, the encryption information from the road side, which is unrelated to the user information stored in the IC card and is desired to be retained, for example, gate information which indicates an entrance gate, a mid-route, and the like, can be held in a form of being left unchanged and can also be transmitted to the road side. Accordingly, the secrecy of the information from the road side can be maintained and the security thereof can be protected.

Further, as described above, the information display means is further provided which outputs the portion of output information desired to be made known to a user without encryption by the IC card and displays the portion of the output information outputted without being encrypted, thereby resulting in that the user can confirm completion of communication or details that are results of accounting processing.

As described above, in the road-to-vehicle communication device of the present invention, the IC card is mounted in the vehicle-mounted communication device and information is mutually communicated with respect to the road-side control means located at the road side. The road-side encryption means of the road-side control means encrypts transmitted information and decodes received information. Accordingly, transmitted information to be transmitted from the road side passes through the vehicle-mounted communication device in a form of being encrypted. As described above as well, processing such as reception of charges can be effected for the IC card in such a manner that accounting information regarding accounting processing of charged facilities is transmitted and received as the transmitted information, and the resulting information also passes through the vehicle-mounted communication device in the form of being encrypted, thereby resulting in no damage to the secrecy of the information.

As described above, the road-to-vehicle communication device encrypts transmitted information with the road-side encryption means of the road-side control means located at an entrance gate and decodes received information by the road-side encryption means of the road-side control means located at a toll reception gate. As a result, the vehicle-mounted communication device does not have encryption means, and therefore, irregularities in charge payment caused by analysis of a cipher of the vehicle-mounted communication device can be made impossible.

Further, according to the invention, information is mutually communicated between the road-side communication means of the road-side control means and the vehicle-mounted communication means of the vehicle-mounted control means. Further, information is mutually transferred between the vehicle-mounted communication means of the vehicle-mounted control means and the information transfer means of the information control means.

During the communication of information, the road-side control means uses the first encryption means, with the first electronic key, to encrypt transmitted information to be transmitted to the vehicle-mounted control means and to decode received information from the vehicle-mounted control means. Further, the vehicle-mounted control means uses the third encryption means, with the first electronic key, to encrypt transmitted information to be transmitted to the road-side control means and to decode received information from the road-side control means. Accordingly, information can be encrypted using the first electronic key so as to be mutually communicated between the road-side control means and the vehicle-mounted control means, and therefore, the secrecy of information is maintained and the security thereof is thereby protected.

During the transfer of information, the vehicle-mounted control means uses the third encryption means, with the second electronic key, to encrypt output information and to decode input information. The information transfer means stores therein user information regarding at least one of a vehicle and a user. When the user information is outputted to the vehicle-mounted control means, the information transfer means uses the second encryption means, with the second electronic key, to encrypt, as output information, the user information and to decode input information from the vehicle-mounted control means. Accordingly, information can be encrypted using the second electronic key so as to be mutually transferred between the vehicle-mounted control means and the information transfer means, and therefore, the secrecy is maintained and the security is thereby protected.

As described above, secrecy is independently maintained using different electronic keys respectively for the communication of information and for the transfer of information, and therefore, the security of the road-to-vehicle communication device can be improved. Further, since secrecy is independently held, leakage of information can be restrained to the minimum until the secrecy becomes clear.

The above-described first, second, and third encryption means are each that which maintains secrecy, and therefore, so long as these encryption means are each made clear, the secrecy can be made clear. Accordingly, as described above as well, by providing each of the first encryption means and the road-side communication means, the second encryption means and the information transfer means, and the third encryption means and the vehicle-mounted communication means on the same substrate, on the same chip, for example, decoding such as analysis becomes difficult and the security of the road-to-vehicle communication device can be improved.

In the vehicle-mounted communication device of the present invention, among the information received from the road side by the transmitting/receiving means, the encryption information is relayed by the relay means to the IC card, and therefore, the encryption information passes through the vehicle-mounted communication device in the form of being left unchanged. Accordingly, there is an effect wherein the secrecy of the encryption information is maintained and the security can be protected.

In the road-to-vehicle communication device of the present invention, the IC card is mounted in the vehicle-mounted communication device which relays the encryption information and information is mutually communicated with respect to the road-side control means which encrypts transmitted information and decodes received information. Accordingly, there is an effect wherein the security can be maintained without the secrecy of the information being damaged.

Further, secrecy is independently maintained using different electronic keys, and therefore, there is an effect wherein the security of the road-to-vehicle communication device can be improved.

Further, by providing the first, second, and third encryption means, respectively together with corresponding road-side communication means, information transfer means, and vehicle-mounted communication means, on the same substrate, there is an effect wherein decoding such as analysis becomes difficult, improving the security of the road-to-vehicle communication device.

BEST MODES FOR CARRYING OUT THE INVENTION

Embodiments of the present invention will hereinafter be described in detail with reference to the accompanying drawings. The present embodiments each show that the present invention is applied to an automatic toll receiving system for automatically receiving a toll from each of vehicles running on a toll road or the like.

In the automatic toll receiving system, information is transferred between an apparatus mounted on a vehicle and an on-road apparatus having flat antennas (or other antennas, for example, Yagi antennas) provided at ground portions of an entrance gate, an exit gate, and the like through radio communications to thereby determine a traffic section (route) over which the vehicle has been driven and the type of the vehicle and automatically accept a traffic toll or the like without stopping the vehicle at the entrance and exit gates.

First Embodiment

A first embodiment will first be described.

Figure 1:
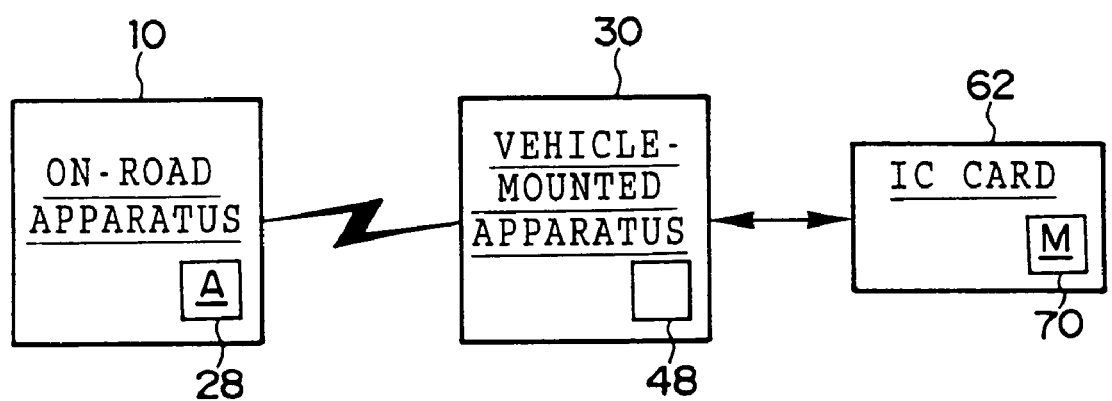
FIG. 1 is a block diagram that shows an automatic toll receiving system according to a first embodiment of the present invention.

As shown in FIG. 1, an automatic toll receiving system of the present embodiment is structured to include an on-road apparatus 10 provided on the road side and a vehicle-mounted apparatus 30 mounted on a vehicle, and information is mutually transferred between the on-road apparatus 10 and the vehicle-mounted apparatus 30 by radio communications. The on-road apparatus communicating with the vehicle-mounted apparatus 30 is provided with flat antennas (or other antennas, for example, Yagi antennas) for transmitting and receiving various information and is disposed at each of an entrance gate of a toll road, a mid-route (check barrier), and an exit gate or the like. The on-road apparatus 10 includes a memory 28 (see FIG. 4) in which an electronic key A for encryption of information is stored and the vehicle-mounted apparatus 30 includes a storage circuit 48 (see FIG. 3) in which the above-described encryption information is stored, as will be described in detail later. When information is mutually transferred between the on-road apparatus 10 and the vehicle-mounted apparatus 30 by radio communications, transmitted information is encrypted using the electronic key A on the side of the on-road apparatus and is transmitted to the vehicle-mounted apparatus 30. This encryption (or decoding) can be provided using a method based on Data Encryption Standard (a so-called DES) or the like.

An IC card 62 (which will be described in detail later) in which various information is stored is provided so as to be detachable from the vehicle-mounted apparatus 30. Information is mutually transferred between the vehicle-mounted apparatus 30 and the IC card 62. The IC card 62 includes a memory 70 (see FIG. 5) in which a security mechanism M provided with a process for encrypting or decoding information is stored. This security mechanism is used to manufacture or issue the IC card 62 and is in advance set in accordance with an operation thereof. A plurality of logic which are provided for encryption or decoding by the security mechanism can be stored on the side of the on-road apparatus and any one security mechanism can be selectively used.

Next, the vehicle-mounted apparatus 30 and the on-road apparatus 10 communicating with the vehicle-mounted apparatus 30 will be described in detail. Further, in the present embodiment, a description will be given in which an on-road apparatus provided in the mid-route 200 is shown as an example. Further, for simplifying an explanation, a mid-route antenna 218 provided for radio communication with a vehicle 90 traveling along a lane 202 and a mid-route antenna control device 232 are used for the explanation. Further, a vehicle-mounted battery (not shown) is connected to the vehicle-mounted apparatus 30.

Figure 2:
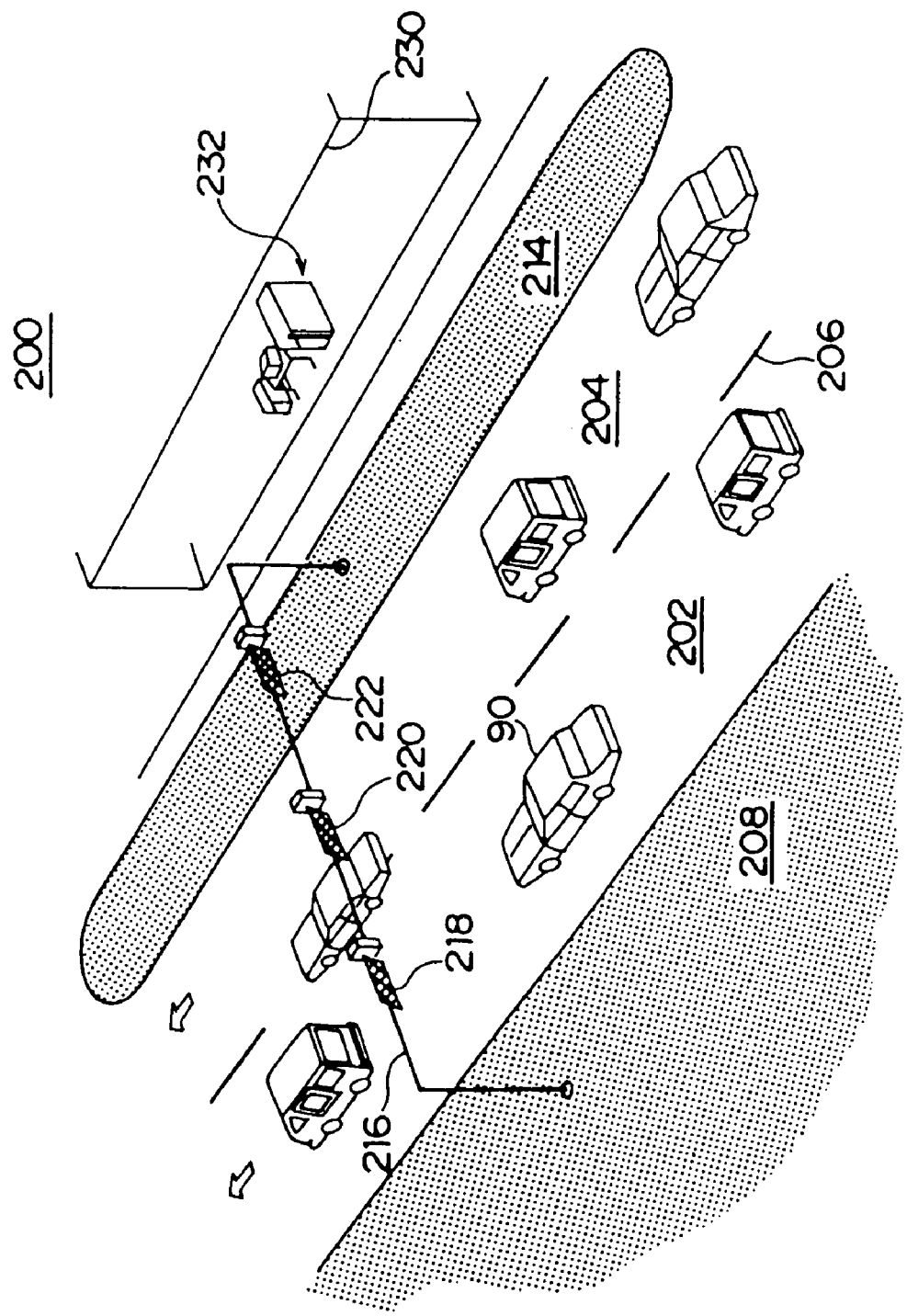
FIG. 2 is a schematic perspective view that shows a mid-route in the automatic toll receiving system of the first embodiment.

As shown in FIG. 2, in the mid-route 200 located immediately before or after a branching point of a toll road, two lanes, the lane 202 and a lane 204, are provided side by side between a ground 208 and a ground 214. An arch 216 is disposed between the ground 208 and the ground 214 in such a manner as to extend over the lanes 202 and 204. Route recognizing antennas 218, 220, and 222 are disposed on the arch 216. The route recognizing antenna 218 is located above the lane 202 for radio communication with a vehicle traveling along the lane 202. The route recognizing antenna 222 is located above the lane 204 for radio communication with a vehicle traveling along the lane 204. The route recognizing antenna 220 is disposed substantially at an intermediate point between the route recognizing antennas 218 and 222 such that it is located above a centerline 206 between the lanes 202 and 204, for radio communication with a vehicle running so as to straddle the boundary between the lanes 202 and 204.

A route control center 230 equipped with the route recognizing antenna control device 232 is disposed on the ground 214. The route recognizing antennas 218, 220, and 222 are connected to the route recognizing antenna control device 232.

In the above-described mid-route 200, the route recognizing antenna control device 232 transmits route information, which represents the kind of route a vehicle 90 traveled on a toll road, to the vehicle-mounted device 30 mounted on the vehicle 90, via the route recognizing antenna. The route recognizing antenna control device 232 can be connected to a central computer for collectively controlling a running state of the vehicle on the toll road. A recovery gate can be disposed at the mid-route 200 so as to write the route information indicating a mid-route into the vehicle-mounted apparatus using the IC card 62. The recovery gate is provided with an IC card read/write device in which the IC card 62 is removably mounted. The IC card read/write device is connected to the central computer. The recovery gate may be disposed at a parking area or a service area.

Meanwhile, at the entrance gate that is another on-road apparatus, entrance information of the toll road is transmitted to the vehicle-mounted apparatus 30 mounted on the vehicle. Further, at the exit gate, exit information which indicates an exit gate is transmitted to the vehicle-mounted apparatus 30 mounted on a vehicle, and for example, traffic charges or tolls corresponding to the section (route) run by the vehicle or to the type of vehicle are automatically received.

This entrance information and exit information can be transferred by an operator via an IC card. For example, when a communication error occurs, at the recovery gate for writing in data such as the entrance information which indicates an entrance gate using the IC card or for reading out data stored in the vehicle-mounted apparatus, the IC card read/write device to which the IC card 62 can be attached and detached is used to enable execution of transfer of the entrance and exit information. Codes such as numbers or the like, which are in advance assigned respectively to positions of toll roads, may be used for the entrance information and route information.

Figure 3:
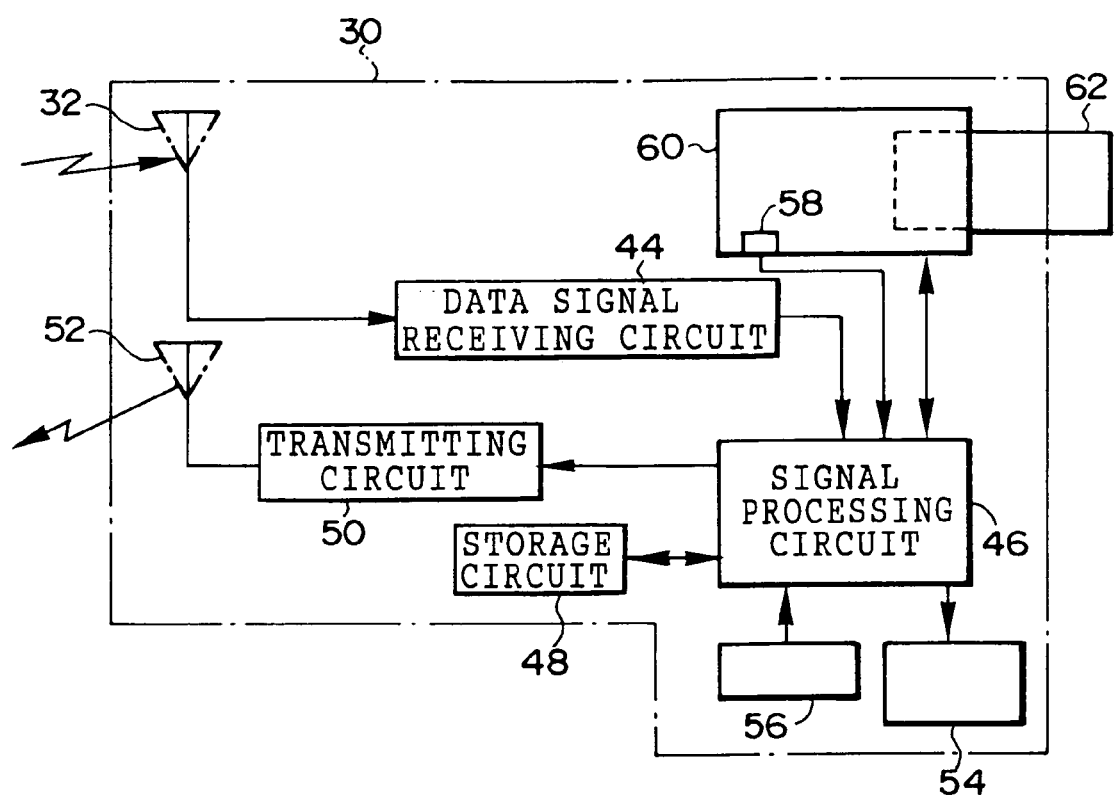
FIG. 3 is a block diagram that shows a vehicle-mounted apparatus of the first embodiment.

As shown in FIG. 3, the vehicle-mounted apparatus 30 is provided with a receiving antenna 32 for receiving a data signal transmitted from the on-road apparatus. The receiving antenna 32 is connected via a data signal receiving circuit 44 to a signal processing circuit 46 structured so as to include a microcomputer. The microcomputer of the signal processing circuit 46 stores therein a processing program, which will be described below.

A storage circuit 48 is connected to the signal processing circuit 46. Information regarding the vehicle-mounted apparatus is stored in the storage circuit 48. Namely, when the vehicle-mounted apparatus is mounted on a vehicle, a vehicle number (the number recorded on a number plate) serving as an ID code and information regarding the type of a vehicle on which the vehicle-mounted apparatus is mounted are in advance stored in the storage circuit 48. Further, a region in which encryption information is stored is in advance allocated in the storage circuit 48. The encryption information includes the entrance information (entrance number, date and time at which the vehicle passed through the entrance gate, and the like) encrypted on a on-road apparatus side, and also includes route information regarding a check barrier (check barrier number, date and time at which the vehicle passed through the check barrier), if the vehicle passes through the mid-route (check barrier), which will be described later in detail.

A transmission circuit 50 which transmits as a response signal a data signal including an ID code is connected to the signal processing circuit 46. The transmission circuit 50 is connected to a transmission antenna 52. The vehicle-mounted apparatus 30 transmits the data signal from the signal processing circuit 46 via the transmission antenna 52. The transmission antenna 52 may be provided to function as a transmission/reception antenna.

An IC card read/write device 60 is connected to the vehicle-mounted apparatus 30 so as to read data from the mounted IC card 62 and to write data in the IC card 62. The IC card read/write device 60 is equipped with a limit switch 58 which mechanically detects insertion of the IC card 62. Whether the IC card is inserted may be optically detected by determining whether light is interrupted by the inserted IC card using a photo-interrupter formed with a light emitting element and a light receiving element being disposed opposite to each other.

Connected to the signal processing circuit 46 are a display 54 comprised of an LCD or a CRT for displaying whether the IC card is inserted or non-inserted and other information including the card value balance, and a ten-key pad 56 (a simple push-button switch may also be used) which inputs a signal to the signal processing circuit 46.

Figure 4:
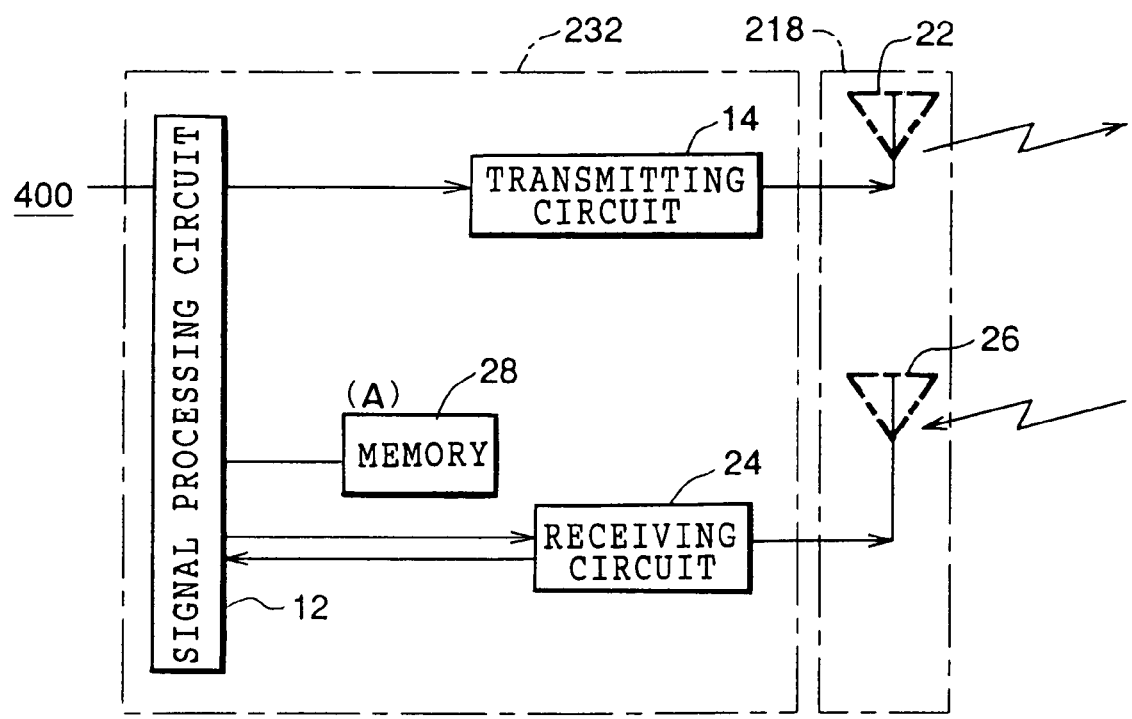
FIG. 4 is a block diagram that shows one example of an on-road apparatus of the first embodiment.

As shown in FIG. 4, the on-road apparatus for a vehicle traveling along the lane 202 is comprised of the mid-route antenna 218 and the mid-route antenna control device 232. The mid-route antenna 218 is comprised of a transmission antenna 22 and a receiving antenna 26. The mid-route antenna control device 232 is provided with a signal processing circuit 12 structured so as to include a microcomputer. The microcomputer stores therein a processing program which will be described later. The signal processing circuit 12 can be connected to a central computer 400 (not shown).

The signal processing circuit 12 is connected to a transmission circuit 14 which generates a data signal including an instruction. The transmission circuit 14 is connected to the transmission antenna 22 and a signal from the transmission circuit 14 is transmitted from the transmission antenna 22. Further, connected to the signal processing circuit 12 is a receiving circuit 24 to which the receiving antenna 26 for receiving a signal transmitted from the vehicle-mounted apparatus 30 is connected. The receiving circuit 24 fetches and outputs a data signal included in the signal transmitted from the vehicle-mounted apparatus 30, via the receiving antenna 26.

Also connected to the signal processing circuit 12 is the memory 28. The memory 28 in advance stores therein the electronic key A. Encryption of transmitted information and decoding of received information are effected using the electronic key A in the on-road apparatus at the mid-route. The memory 28 also in advance stores therein the security mechanism M used for transfer of data between the IC card 62 and the memory 28.

Other structures in the mid-route 200 are the same as the above-described ones, and therefore, descriptions thereof will be omitted. Further, respective antennas and antenna control devices at the entrance gate and the exit gate are substantially the same in structure as those referred to above, and descriptions thereof will be omitted.

In the above-described vehicle-mounted apparatus and on-road apparatus, an antenna formed with a transmission antenna and a receiving antenna being separated from each other is used. However, a transmission/reception type antenna may be used.

Further, in the above-described embodiment, the same electronic key is used both for encryption and decoding, but different electronic keys may also be used.

Figure 5:
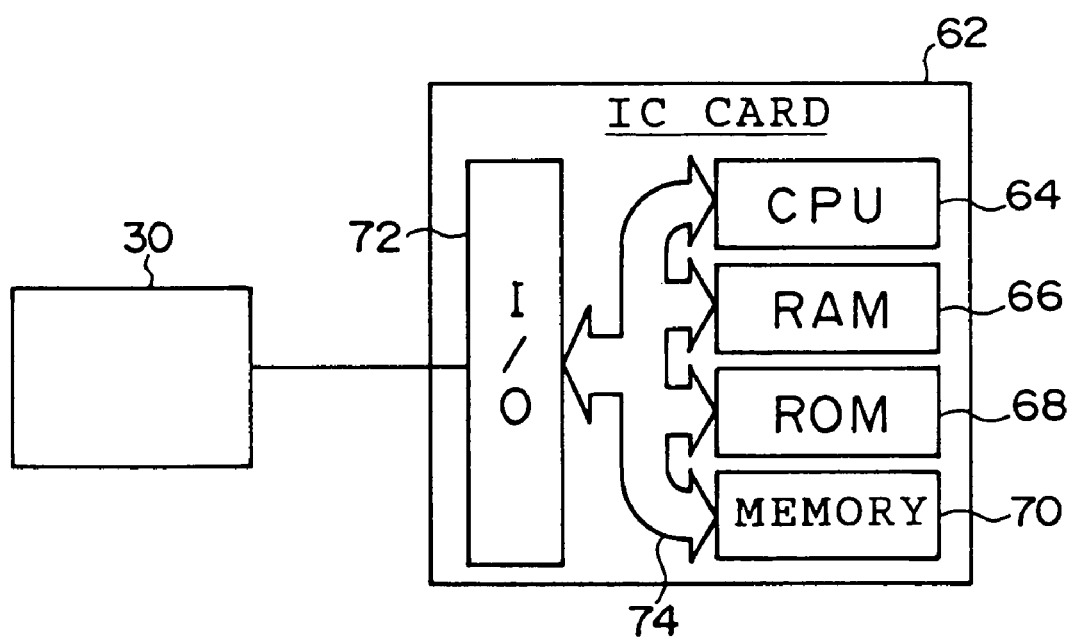
FIG. 5 is a block diagram that shows a structure of an IC card of the first embodiment.

As shown in FIG. 5, the IC card 62, which can be inserted in the vehicle-mounted apparatus 30, is comprised of a microcomputer including a CPU 64, a RAM 66, a ROM 68, the memory 70, and an input/output (I/O) port 72, which are connected by a bus 74 so as to allow transfer of a command or data therebetween. The memory 70 is used to store the security mechanism M and various information. The ROM 68 stores therein a processing routine which will be described later. The input/output port 72 can be connected to the vehicle-mounted apparatus 30. Although not illustrated, the IC card 62 is provided with a power source circuit so as to supply a power source when necessary.

The above-described IC card can store, as various information, information regarding the vehicle-mounted apparatus such as a card number, balance information, information about utilization details (entrance gate number, exit gate number, toll, time and date of utilization, and the like), and also can store a certified key code for having a card correspond to a vehicle-mounted apparatus.

Next, an operation of the present embodiment will be described.

Figure 11:
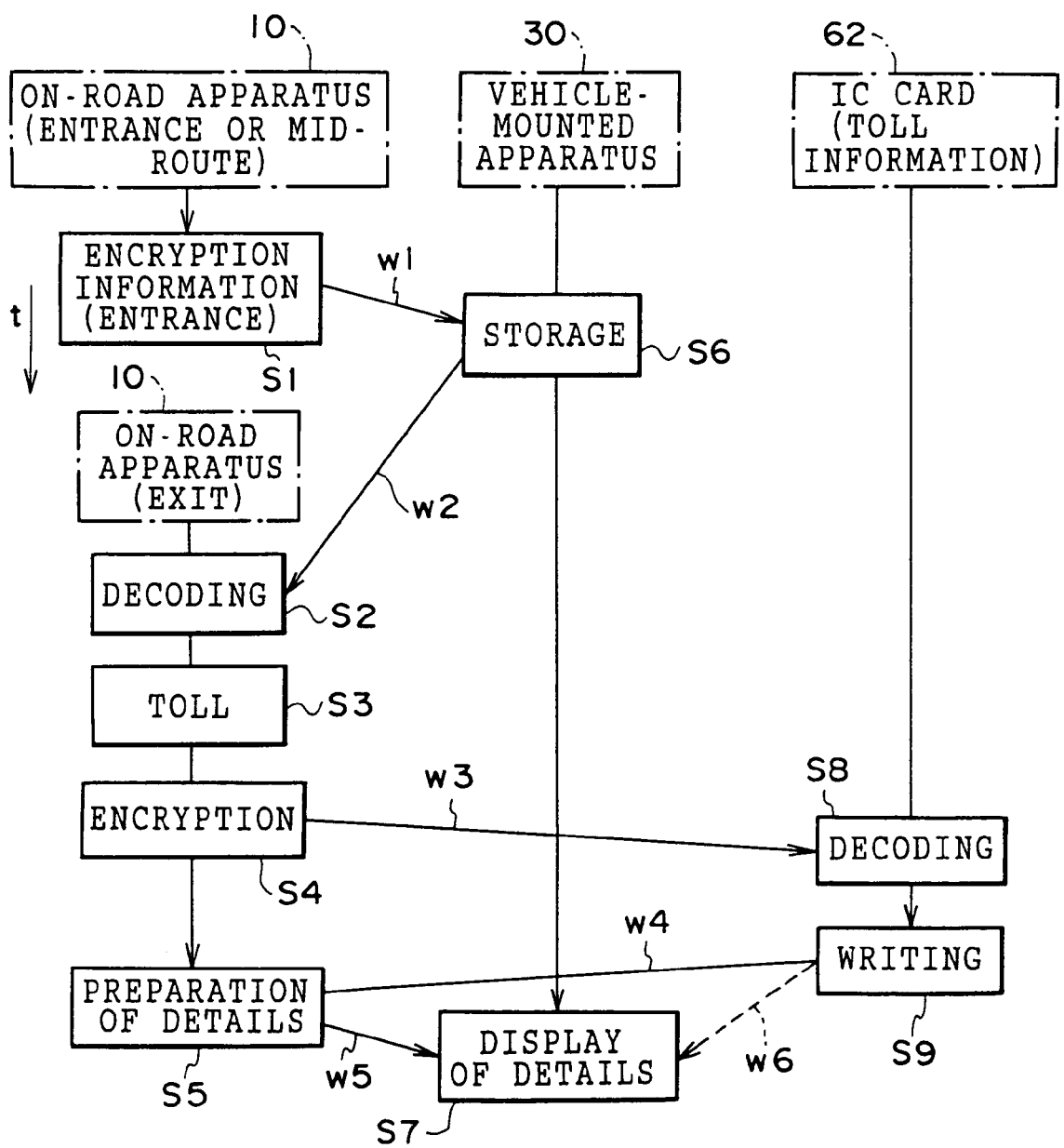
FIG. 11 is an image diagram that shows the relationship between the on-road apparatus, the vehicle-mounted apparatus, and the IC card of the first embodiment when information is mutually transferred therebetween.

A description will first be given of communication processing which is mutually effected between an on-road apparatus and the vehicle-mounted apparatus. FIG. 11 shows a main process effected in each of the on-road apparatus, the vehicle-mounted apparatus, and the IC card, and a flow of information which is mutually transferred therebetween.

Figure 7:
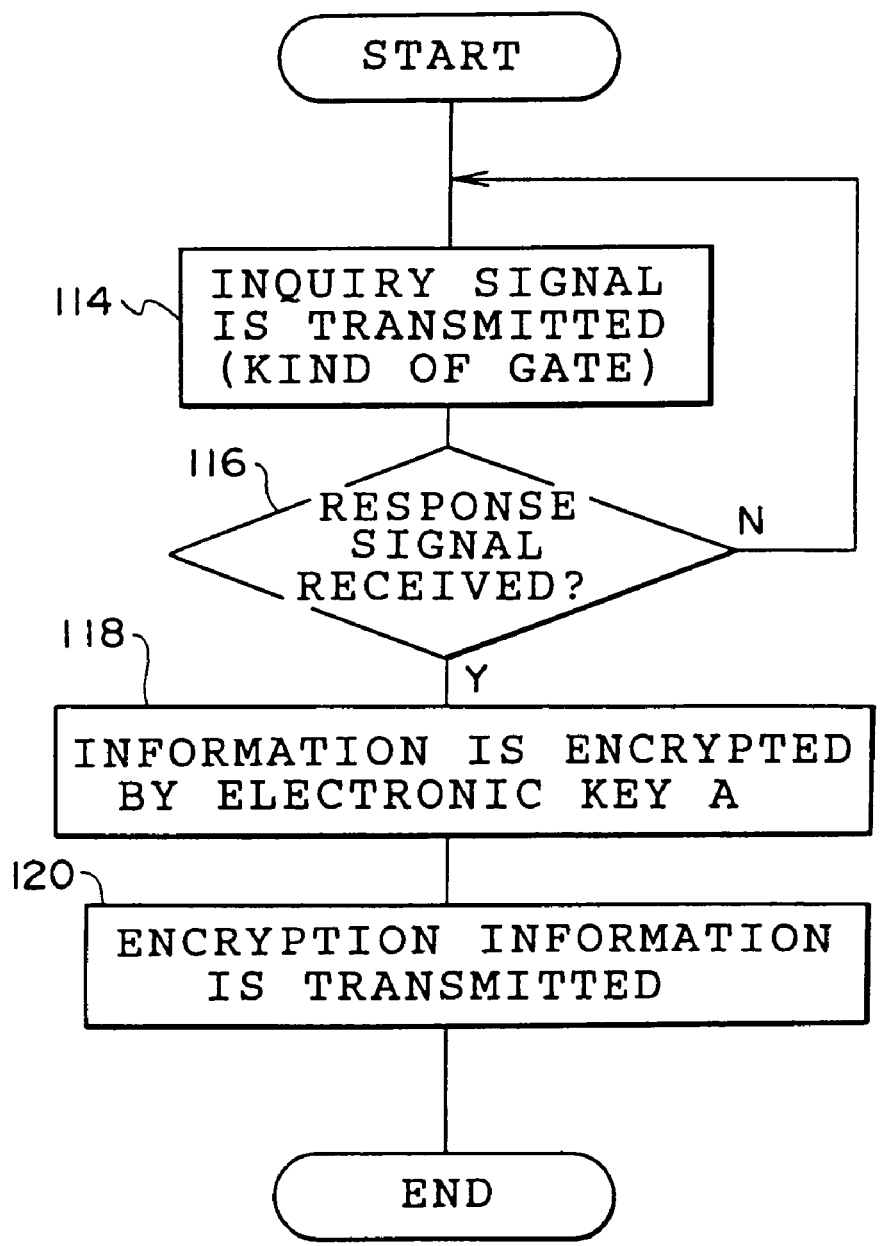
FIG. 7 is a flow chart that shows a flow in a process of the on-road apparatus of the first embodiment in a mid-route.

As shown in FIG. 7, in step 114, the on-road apparatus located in the mid-route transmits an inquiry signal until it receives a response signal from the vehicle-mounted apparatus 30. When the on-road apparatus receives the response signal (when the decision of step 116 is affirmative), in the subsequent step 118, gate information, in this case, route information is encrypted by the electronic key A (corresponding to process S1 shown in FIG. 11). In step 120, a signal including the encrypted route information and the like is transmitted (corresponding to a transfer w1 in FIG. 11). The above-described inquiry signal includes information that indicates the kind of gate at which the on-road apparatus is provided. The information that represents the kind of gate includes, for example, a gate number expressed by a common sentence or simple common-sentence information such as "entrance", "mid-route", and the like.

Further, in the on-road apparatus at the entrance gate, substantially the same processing as the above-described one is effected, but in place of the signal including the route information and the like, a signal including an entrance gate number indicating an entrance gate, and the like is encrypted and transmitted. Further, in the on-road apparatus at the exit gate as well, substantially the same processing as the above-described one is effected. A toll receiving operation effected via communications will be described later.

The on-road apparatus as can transmit, to the vehicle-mounted apparatus, simple common-sentence information as the information that indicates the kind of gate. Other information may also be selectively indicated as common-sentence information or encryption information in the on-road apparatus by separating from each other beforehand information that may be made into a common sentence as simple common-sentence information, and information that should be encrypted as encryption information.

As described above, the on-road apparatus 10 transmits to the vehicle-mounted apparatus 30 the encryption information, and therefore, the information transferred between the on-road apparatus 10 and the vehicle-mounted apparatus 30 can maintain secrecy, and security with respect to interception of information is improved.

Figure 6:
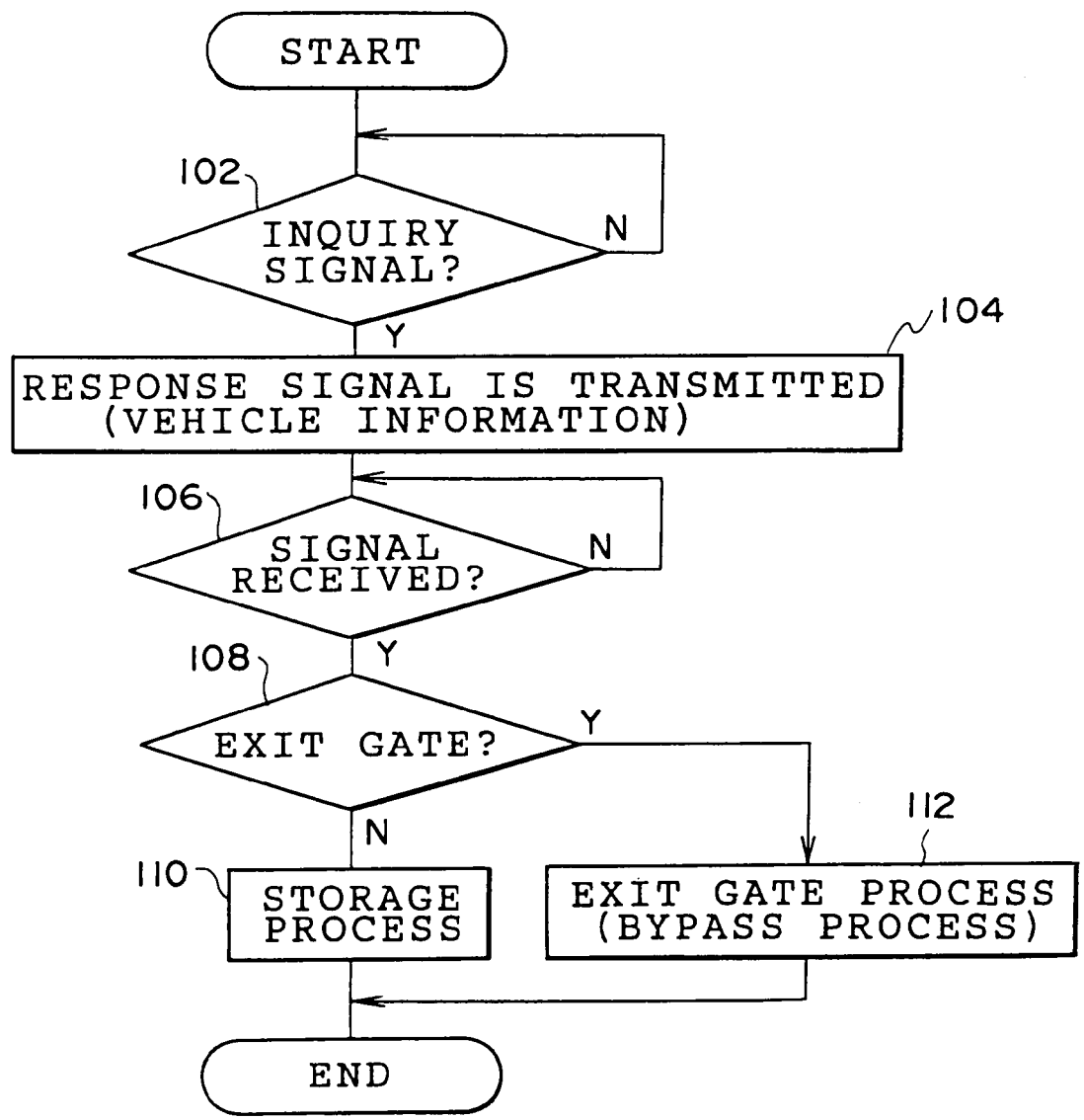
FIG. 6 is a flow chart that shows a flow in a process of the vehicle-mounted apparatus of the first embodiment.

FIG. 6 shows in detail communication processing of the vehicle-mounted apparatus. When in step 102 the vehicle-mounted apparatus waits until it receives an inquiry signal from the on-road apparatus, and then receives the inquiry signal (when the decision of step 102 is affirmative), in the subsequent step 104, the vehicle-mounted apparatus reads vehicle information (for example, an ID code such as an identification code that specifies a driver's own vehicle) and transmits, as a response signal, a signal including the vehicle information.

When in step 106 the vehicle-mounted apparatus waits until it receives a signal from the on-road apparatus and then receives the signal (when the decision of step 106 is affirmative), it is determined that certification of the on-road apparatus and the vehicle-mounted apparatus has been completed, and in the subsequent step 108, it is determined whether accounting processing is required by determining whether the kind of gate indicates the exit gate using the information included in the inquiry signal and indicating the kind of gate at which the on-road apparatus is provided. When the kind of gate is the exit gate, accounting processing is required, and therefore, the decision of step 108 is affirmative. In step 112, the accounting processing is executed, as will be described later, and the present routine ends.

On the other hand, when the kind of gate is an entrance gate or a mid-route, the accounting processing is not required, and therefore, the decision of step 108 is negative and the process proceeds to step 110. In step 110, information transmitted from a gate at which the accounting processing is not required, namely, encryption information based on the signal received in step 106 is stored in the storage circuit 48 as is (corresponding to a process S6 in FIG. 11) and the present routine ends. Accordingly, the contents of the entrance information or route information are stored in the storage circuit 48 of the vehicle-mounted apparatus 30 in a state of being left encrypted.

As described above, since the entrance information or route information is maintained in the vehicle-mounted apparatus 30 in a state of being left encrypted, it becomes difficult to intercept the information transferred between the on-road apparatus 10 and the vehicle-mounted apparatus 30 resulting from a common-sentence structure and secrecy is maintained, thereby resulting in improvement of security with respect to interception of information. Further, the vehicle-mounted apparatus may merely store the encrypted information and does not need to provide a processing portion for encryption or decoding. For this reason, irregularities in charge payment caused by alteration, reproduction, and falsification due to disassembly inspection of a vehicle-mounted apparatus or analysis of a cipher are made impossible and the device configuration can be simplified.

Next, a description will be given of processing at an exit gate.

Figure 9:
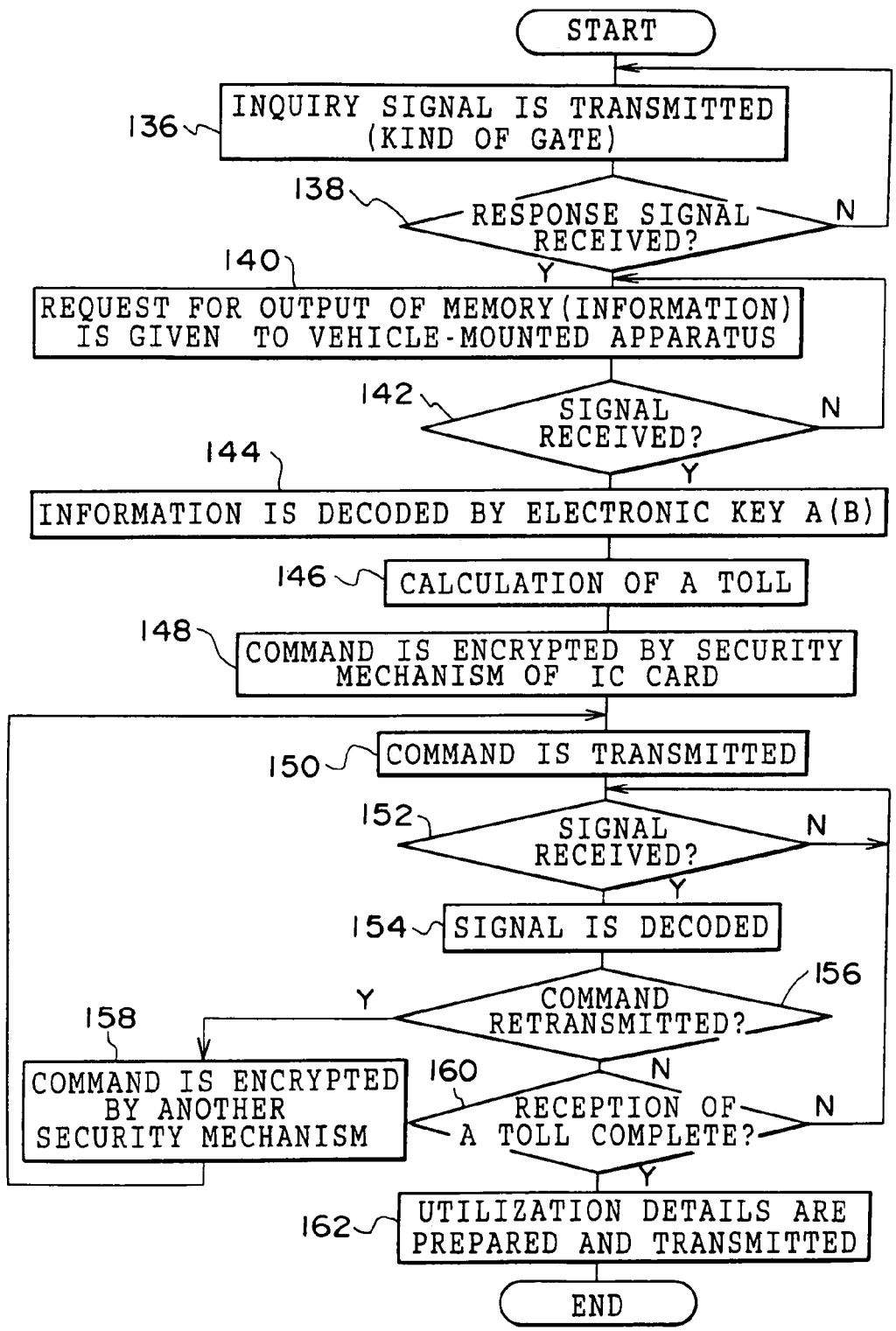
FIG. 9 is a flow chart that shows a flow in a process of the on-road apparatus at an exit gate of the first embodiment.

As shown in FIG. 9, when in step 136 an on-road apparatus installed at an exit gate transmits an inquiry signal including the kind of gate until it receives a response signal from the vehicle-mounted apparatus 30 and the on-road apparatus then receives the response signal (when the decision of step 138 is affirmative), in the subsequent step 138, the on-road apparatus transmits an information read-out requesting signal to the vehicle-mounted apparatus 30. This step 138 gives a request for reading out the encryption information stored in the storage circuit 48 of the vehicle-mounted apparatus 30 to the vehicle-mounted apparatus. Subsequently, when in step 140 the on-road apparatus transmits the information read-out requesting signal until it receives a signal from the vehicle-mounted apparatus 30 and the on-road apparatus then receives the signal (when the decision of step 142 is affirmative), in the subsequent step 144, the electronic key A is read and the received signal is decoded using the electronic key A (corresponding to a process S2 in FIG. 11).

Meanwhile, different electronic keys A can be used at the time of encryption and decoding, and an electronic key B (≠A) used for decoding may be stored and used.

In the subsequent step 146, using the decoded entrance information and route information and information regarding the type of a vehicle stored in the vehicle-mounted apparatus, tolls charged the vehicle in a distance from the entrance gate, the mid-route, and until the exit gate are calculated, and data or command is generated which is used to collect automatically the calculated tolls using the IC card (corresponding to a process S3 in FIG. 11). In the subsequent step 148, the generated data or command is encrypted by the security mechanism M of the IC card (corresponding to process S4 in FIG. 11), and in the subsequent step 150, the encrypted data or command is transmitted. The data or command encrypted in step 148 is transmitted through the vehicle-mounted apparatus and is transferred to the IC card, as will be described later in detail (corresponding to a transfer w3 in FIG. 11).

In the subsequent step 152, the on-road apparatus waits until it receives a signal from the vehicle-mounted apparatus, and when the on-road apparatus receives the signal (when the decision of step 152 is affirmative), in the subsequent step 154, the signal is decoded by the security mechanism M of the IC card. The received signal is an information signal from the IC card. In other words, the encryption information outputted from the IC card 62 is transmitted by the vehicle-mounted apparatus in a state of being left unchanged (corresponding to the transfer w3 in FIG. 11). Further, when the IC card does not have the security mechanism M, as will be described later, the IC card sends back to the on-road apparatus the encryption information in a state of being left unchanged, for example.

In the subsequent step 154, the received signal is decoded. In step 156, based on a determination as to whether the data or command transmitted in the above-described step 150 has been sent back left unchanged, it is determined whether accounting processing has been carried out using the IC card 62 mounted on the vehicle-mounted apparatus 30. When the transmitted data or command has been sent back left unchanged, the decision of step 156 is affirmative, and in step 158, the data or command is encrypted by a security mechanism different from the security mechanism M. Thereafter, the process returns to step 150 and the above-described process is repeated.

In the foregoing, first, a cipher is transmitted by the security mechanism M. When this mechanism is different from that at the side of the IC card 62, it is sequentially changed to the different mechanism, and thereafter, encryption is effected so as to allow coincidence of security mechanisms. Alternatively, first, the mechanism at the side of the IC card 62 is interrogated, and based on the answer thereto, the security mechanism may be determined. As a result, even when one security mechanism to be used is selected from a great number of security mechanisms, high speed processing becomes possible.

On the other hand, when the decision of step 156 is negative, it is determined that the accounting processing has been carried out using the IC card 62. In the subsequent step 160, it is determined whether the received signal includes data indicating that reception of tolls has been completed. When the signal does not include such data, the decision of step 160 is negative and the process returns to step 152. When the received signal includes the data which indicates that reception of tolls has been completed, the decision of step 160 is affirmative. In the subsequent step 162, utilization details regarding reception of tolls are prepared (corresponding to a process S5 in FIG. 11), and are further transmitted, together with an end signal, to the vehicle-mounted apparatus in the form of a common sentence without being encrypted (corresponding to a transfer w5 in FIG. 11). Meanwhile, the preparation of utilization details effected by the on-road apparatus and the transmission of the end signal to the vehicle-mounted apparatus may also be carried out in the IC card 62 (corresponding to a transfer w6 in FIG. 11).

Figure 8:
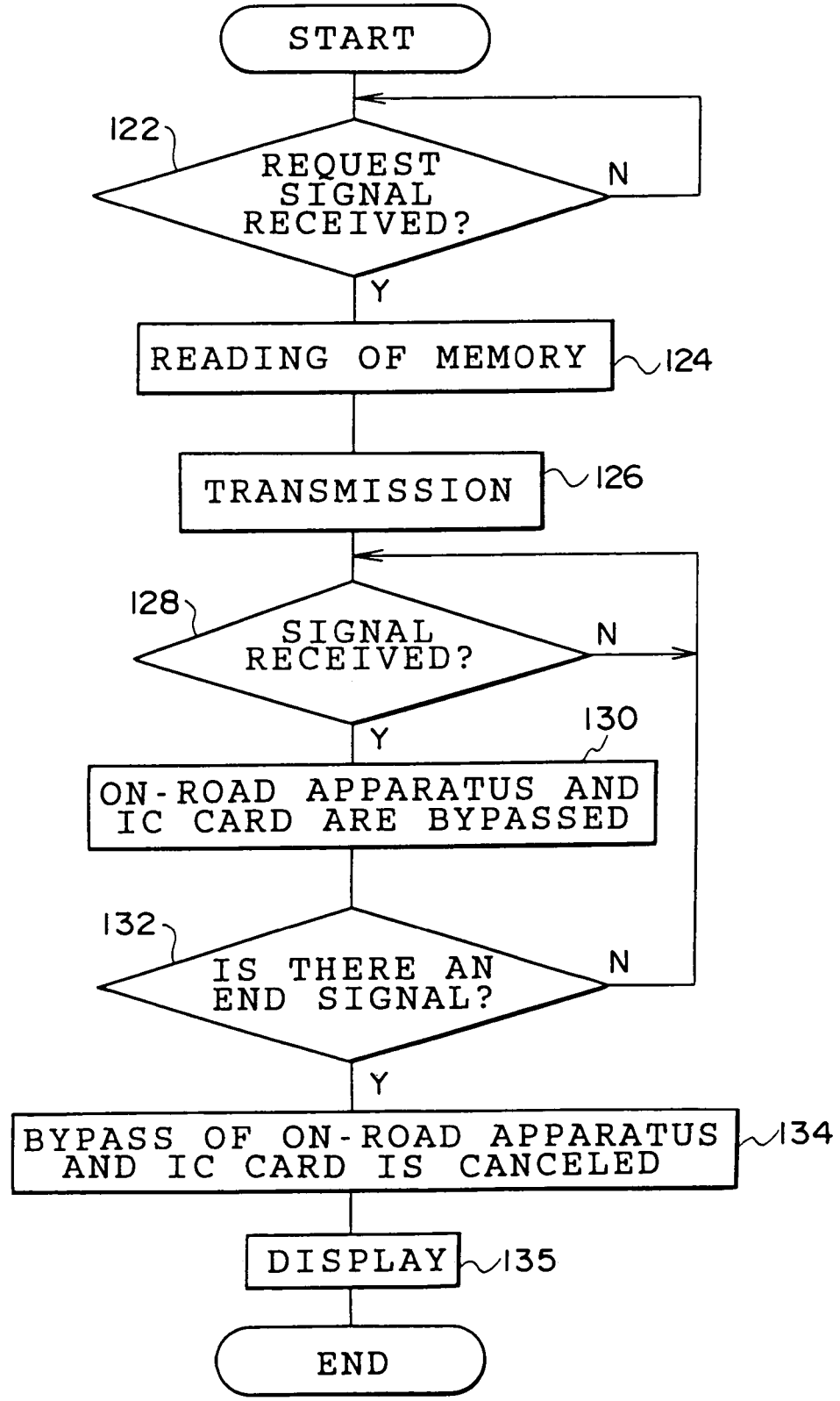
FIG. 8 is a flow chart that shows a flow in an exit gate process of the vehicle-mounted apparatus of the first embodiment.

FIG. 8 shows in detail, as processing effected by the vehicle-mounted apparatus, an exit gate process in step 112 shown in FIG. 6. In step 122, the vehicle-mounted apparatus waits until it receives the information read-out requesting signal transmitted from the on-road apparatus. When the vehicle-mounted apparatus receives the information read-out requesting signal (when the decision of step 122 is affirmative), in the subsequent step 124, the encryption information stored in the storage circuit 48 is read out as is left unchanged. In the subsequent step 126, the encryption information is transmitted as is left unchanged (corresponding to a transfer w2 in FIG. 11).

In the subsequent step 128, the vehicle-mounted apparatus waits until it receives a signal from the on-road apparatus, and when the vehicle-mounted apparatus receives the signal (when the decision of step 128 is affirmative), in the subsequent step 130, the on-road apparatus 10 and the IC card 62 are bypassed. Namely, the received signal from the on-road apparatus 10 is outputted to the IC card 62 in a state of being left unchanged, and the output signal outputted from the IC card 62 is transmitted to the on-road apparartus 10 in a state of being left unchanged (corresponding to the passing through the vehicle-mounted apparatus indicated by the transfer w3 and w4 in FIG. 11). This received signal and output signal are encrypted, and therefore, they may be temporarily stored in the vehicle-mounted apparatus.

In the subsequent step 132, it is determined whether the received signal includes an end signal in the form of a common sentence. When the signal does not include the end signal, the decision of step 132 is negative and the process returns to step 128. When the signal includes the end signal, the decision of step 132 is affirmative, and in step 134, bypassing of the on-road apparatus 10 and the IC card 62 is cancelled, and in the subsequent step 135, the received utilization details for reception of tolls is indicated (corresponding to a process S7 in FIG. 11).

Figure 10:
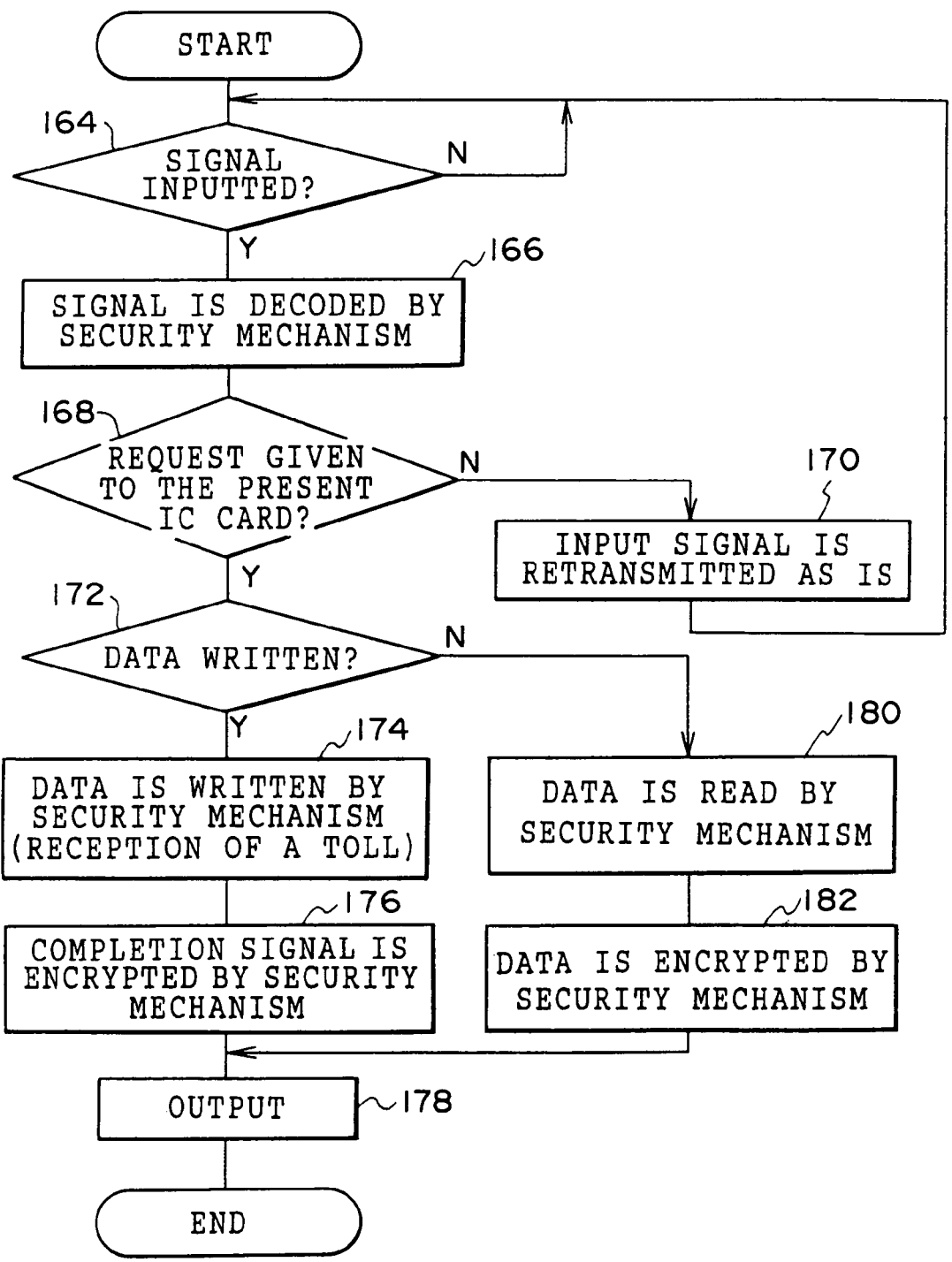
FIG. 10 is a flow chart that shows a flow in a process of the IC card of the first embodiment.

FIG. 10 shows a process of the IC card 62; it is determined whether a signal is inputted from the vehicle-mounted apparatus 30. When a signal is not inputted, the decision of step 164 is negative and the decision of step 164 is made repeatedly. On the other hand, when a signal is inputted (corresponding to the transfer w4 in FIG. 11), the decision of step 164 is affirmative. In the subsequent step 166, a signal inputted by decoding processing included in the security mechanism M is decoded (corresponding to a process S8 in FIG. 11). In the subsequent step 168, it is determined whether the decoded signal is a read/write request given to the IC card 62.

When the inputted signal cannot be decoded or when a request other than the read/write request is given, the decision of step 168 is negative. In the subsequent step 170, a signal inputted from the vehicle-mounted apparatus is sent back in a state of being left unchanged, and thereafter, the process returns to step 164. As a result, correspondence of an IC based on a plurality of different security mechanisms is made possible. On the other hand, when the process for the IC card 62 is the request for reading and writing date, the decision of step 168 is affirmative. In the subsequent step 172, it is determined whether the request is that for writing, and when the request is that for writing data, the decision of step 172 is affirmative, and the process proceeds to step 174. When the request is that for reading, the decision of step 172 is negative and the process proceeds to step 180.

In step 174, data is written in the memory 70 by the security mechanism M. For example, reception of tolls in which tolls that are decoded data from the on-road apparatus is charged with respect to the balance of charges for accounting and the resulting balance of charges (balance information) is written in the memory 70 (corresponding to a process S9 in FIG. 11). In the subsequent step 176, the data written in the memory 70, for example, the balance information and a toll-reception completion signal are encrypted by the securing mechanism M and are, in step 178, outputted to the vehicle-mounted apparatus 30 (corresponding to the passing through the vehicle-mounted apparatus and outputting to the on-road apparatus indicated by the transfer w4 in FIG. 11).

In step 180, data is read from the memory 70 by the security mechanism M. In the subsequent step 182, the read data balance information, for example, is encrypted, and in step 178, it is outputted to the vehicle-mounted apparatus 30.

As described above, in the present embodiment, among information to be communicated between the on-road apparatus and the vehicle-mounted apparatus, information such as entrance information or route information, which has a high secrecy to prohibit alteration thereof, is used in a state of being left encrypted (in the form of encryption information) and the encrypted information is temporarily stored in the vehicle-mounted apparatus as it is. Accordingly, alteration of information such as entrance information or route information becomes difficult; therefore, the reliability of the information itself can be improved and the secrecy thereof can be maintained.

Further, in a case in which reading and writing is effected for an IC card in which user information regarding a user such as the balance of charges or the like is stored, when information is transferred using the encryption information encrypted by the security mechanism of the IC card itself and the information of the IC card is outputted via the vehicle-mounted apparatus which transmits and receives information to and from the on-road apparatus, or when the information from the on-road apparatus is inputted, the vehicle-mounted apparatus merely allows passing of the encrypted information and does not decode the information. Accordingly, information is not altered and the secrecy thereof can be maintained.

Moreover, the vehicle-mounted apparatus merely allows passing of the encryption information therethrough, and therefore, the vehicle-mounted apparatus does not need to provide processing for encryption or decoding. As a result, the structure of the vehicle-mounted apparatus is simplified and a calculation load of the vehicle-mounted apparatus can be reduced.

Further, in the road-to-vehicle communications, a two-way communication (optical communication or the like is also possible) is employed and the present invention can be applied thereto.

The above-described system can be applied to a road or a parking area for simple reception of tolls wherein a gate is not present.

Further, in the above-described system, there was described a case in which a vehicle-mounted apparatus includes neither a structure nor a process for encryption and decoding, but a common sentence-structured portion may be deleted by well-known general encryption.

Second Embodiment

Next, a second embodiment will be described. Further, this embodiment has substantially the same structure as that of the above-described embodiment, and therefore, the same members as those of the above-described embodiment will be denoted by the same reference numerals and detailed descriptions thereof will be omitted.

Figure 12:
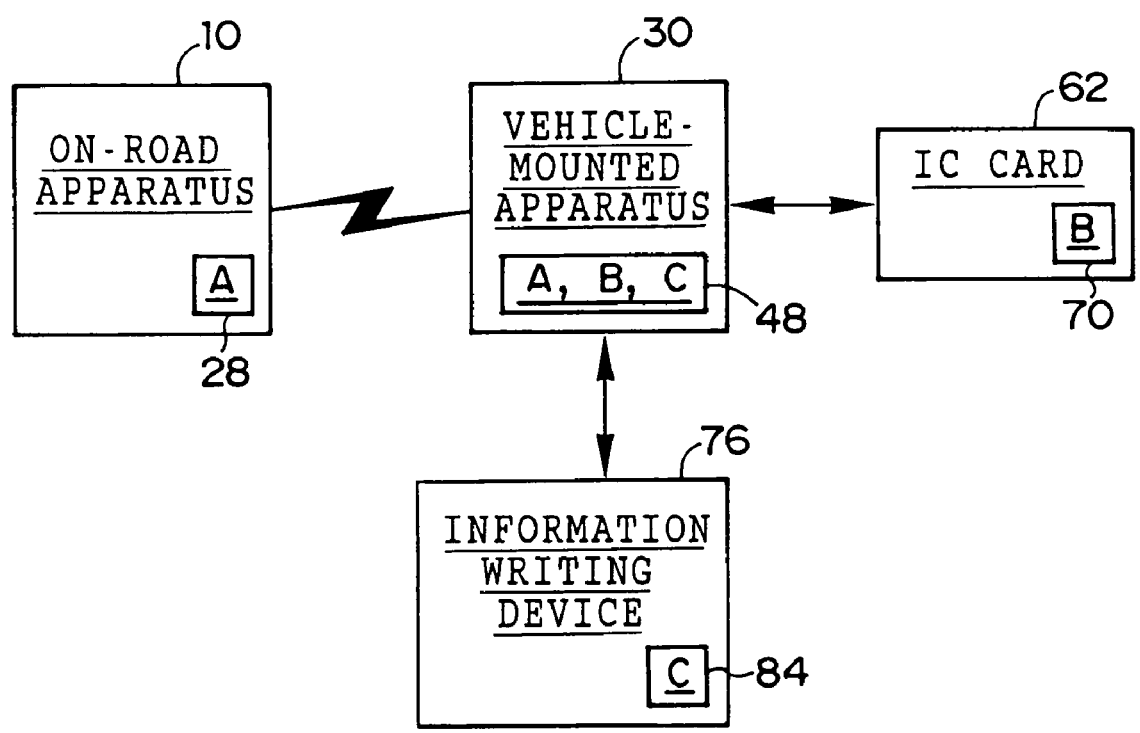
FIG. 12 is a block diagram that shows an automatic toll receiving system according to a second embodiment of the present invention.

As shown in FIG. 12, an automatic toll receiving system of the present embodiment is structured to include the on-road apparatus 10 provided on the road side and the vehicle-mounted apparatus 30 mounted on a vehicle. Information is mutually transferred between the on-road apparatus 10 and the vehicle-mounted apparatus 30 by radio communications. An on-road apparatus communicating with the vehicle-mounted apparatus 30 includes antennas for transmitting and receiving various information and is disposed in each of an entrance gate of a toll road, a mid-route thereof, and an exit gate. The on-road apparatus 10 includes a memory 28 (see FIG. 14) in which the electronic key A is stored, and the vehicle-mounted apparatus 30 includes the storage circuit 48 (see FIG. 13) in which electronic keys A, B, and C are stored, as will be described in detail later. When information is mutually transferred between the on-road apparatus 10 and the vehicle-mounted apparatus 30 by radio communications, transmitted information is encrypted and received information is decoded, using the electronic key A.

The above-described encryption and decoding can be provided using a secret key encryption system (for example, Data Encryption Standard (DES)).

The IC card 62 (described in detail later) in which various information is stored is detachable from the vehicle-mounted apparatus 30. Information is mutually transferred between the vehicle-mounted apparatus 30 and the IC card 62. The IC card 62 includes the memory 70 (see FIG. 15) in which the electronic key B is stored. When information is transferred between the vehicle-mounted apparatus 30 and the IC card 62, transmitted information is encrypted using the electronic key B and received information is decoded.

The type of a vehicle on which the vehicle-mounted apparatus 30 is mounted or vehicle information such as an ID number may be written in the vehicle-mounted apparatus 30. The vehicle information is written using an information writing device 76. The information writing device 76 includes a memory 84 in which the electronic key C is stored (see FIG. 15). When the vehicle information is transferred between the vehicle-mounted apparatus 30 and the information writing device 76, the vehicle information is encrypted using the electronic key C and received information is decoded.

Next, the vehicle-mounted apparatus 30 and the on-road apparatus 10 communicating with the vehicle-mounted apparatus 30 will be described in detail. The present embodiment will be described with an on-road apparatus provided in the mid-route 200 being given as an example. Further, for simplifying explanation, the mid-route antenna 218 provided for radio communication with the vehicle 90 traveling along the lane 202 and the mid-route antenna control device 232 are used. A vehicle-mounted battery (not shown) is connected to the vehicle-mounted apparatus 30.

Similar to the above-described embodiment, in the mid-route 200 of the present embodiment, the two lanes 202 and 204 are provided side by side. The arch 216 on which the route recognizing antennas 218, 220, and 222 are disposed is provided between the ground 208 and the ground 214 in such a manner as to extend over the lanes 202 and 204. (see FIG. 2).

Figure 13:
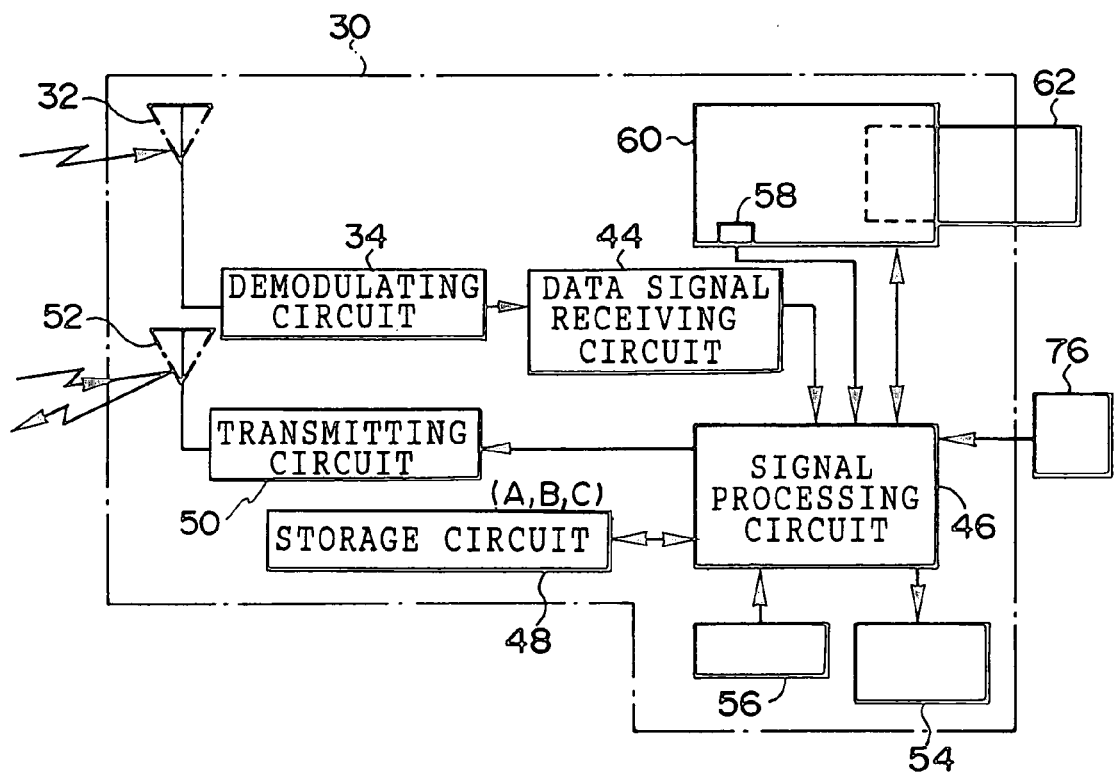
FIG. 13 is a block diagram that shows a vehicle-mounted apparatus of the second embodiment.

As shown in FIG. 13, the vehicle-mounted apparatus 30 includes the receiving antenna 32 for receiving a data signal transmitted from the on-road apparatus. The receiving antenna 32 demodulates a received modulated wave and is connected to a demodulation circuit 34 for obtaining the data signal. The demodulation circuit 34 can also obtain a carrier wave of an electric wave transmitted from the on-road apparatus and may be connected to the transmission circuit 50. The demodulation circuit 34 is connected via the data signal receiving circuit 44 to the signal processing circuit 46 including a microcomputer. The microcomputer of the signal processing circuit 46 stores therein a processing program and the like, as will be described later.

The storage circuit 48 is connected to the signal processing circuit 46. The storage circuit 48 in advance stores therein the electronic keys A, B, and C. Further, the information writing device 76 can be connected to the signal processing circuit 46 and information regarding a vehicle-mounted apparatus is stored in the storage circuit 48. Namely, when the vehicle-mounted apparatus is mounted on a vehicle, a vehicle number (the number recorded on a number plate) serving as an ID code is stored in the storage circuit 48 by the information writing device 76 and information regarding the type of the vehicle on which the vehicle-mounted apparatus is mounted is also stored in the storage circuit 48. Further, when the IC card 62 is inserted, information about the balance (such as information about the money left and the result of updating of the balance at the time that the IC card 62 is used within a service area at which the vehicle stops midway) of the IC card 62 is stored in the storage circuit 48. Further, when the vehicle has passed through an entrance gate, a vehicle-type code detected at the entrance gate and entrance information (entrance number, date and time of passage of the vehicle, and the like) are stored in the storage circuit 48. When the vehicle has passed through a mid-route (check barrier), check barrier information (check barrier number and date and time of passage of the vehicle) corresponding to the passed check barrier is stored in the storage circuit 48. And when a communication error arises, communication error information (type of error, positions at which the error occurred (type of gate, gate number, antenna number, and the like), date and time of occurrence of the error, the number of times that an error occurs, and the like) or the like is stored in the storage circuit 48.

The transmission circuit 50 for transmitting, as a response signal, a data signal including an ID code, and the like is connected to the signal processing circuit 46. The transmission circuit 50 is connected to a transmission antenna 52. The vehicle-mounted apparatus 30 modulates a carrier wave obtained by demodulating the modulated wave received at the receiving antenna 32, based on a data signal from the signal processing circuit 46 and can send back the modulated carrier wave through the transmission antenna 52. Meanwhile, the transmission antenna 52 is provided so as to function as a transmitting/receiving antenna. An unmodulated carrier wave transmitted from the on-road apparatus is received by the transmission antenna 52, and thereafter, the unmodulated carrier wave may be modulated by the transmission circuit 50 based on the data signal from the signal processing circuit 46, so as to be sent back via the transmission antenna 52.

Further, the IC card read/write device 60 for reading data from the IC card 62 inserted therein and writing data into the IC card 62 is connected to the vehicle-mounted apparatus 30. The limit switch 58 for mechanically detecting the insertion of the IC card 62 is provided in the IC card read/write device 60. Whether the IC card has been inserted into the IC card read/write device 60 may be optically detected by determining, using a photo-interrupter composed of a light-emitting element and a light-receiving element disposed opposite each other, whether light is cut off by the inserted IC card.

The display 54 comprised of an LCD or CRT for displaying whether the IC card has been inserted, the balance, and the like thereon, and the ten key 56 for inputting a signal to the signal processing circuit 46 are each connected to the signal processing circuit 46.

Figure 14:
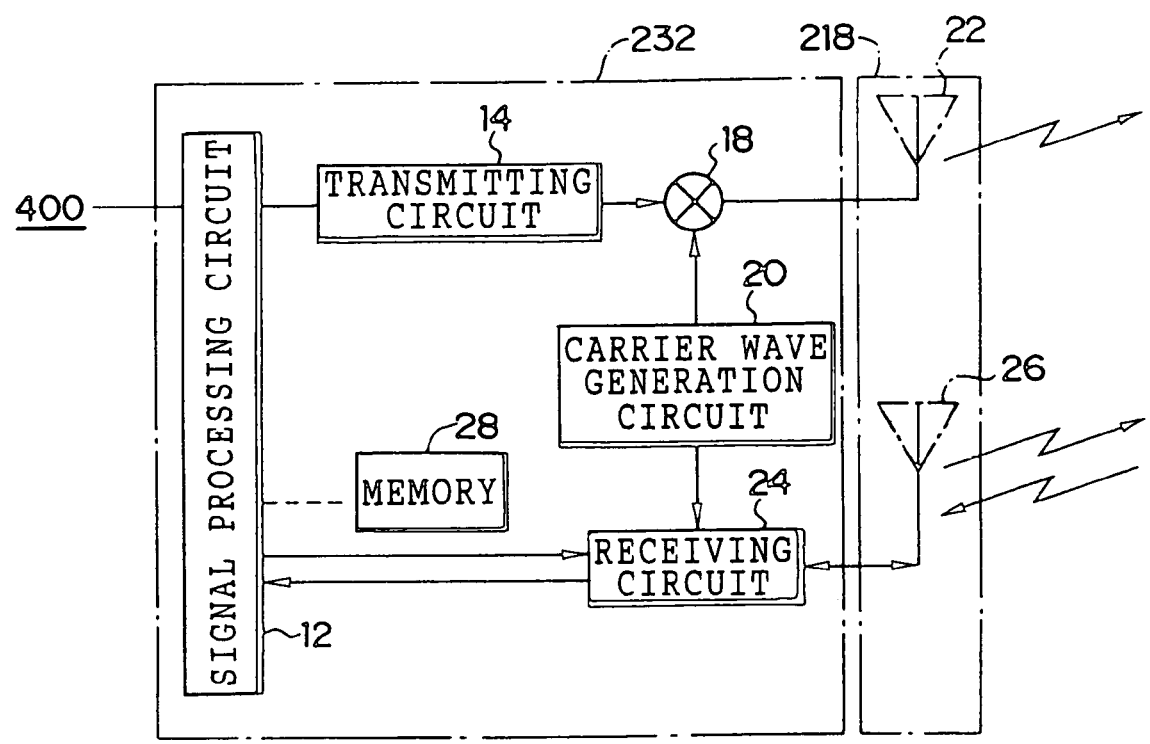
FIG. 14 is a block diagram that shows one example of an on-road apparatus of the second embodiment.

As shown in FIG. 14, the on-road apparatus for a vehicle traveling along the lane 202 is comprised of the mid-route antenna 218 and the mid-route antenna control device 232. The mid-route antenna 218 is comprised of the transmission antenna 22 and the receiving antenna 26. The mid-route antenna control device 232 has the signal processing circuit 12 including a microcomputer. The microcomputer stores therein a processing program which will be described later. The signal processing circuit 12 can be connected to a central computer 400 (not shown). The signal processing circuit 12 is connected to the transmission circuit 14 which generates a data signal including an instruction (a communication requesting signal). The transmission circuit 14 is connected via a mixer 18 to the transmission antenna 22. A carrier wave generation circuit 20 which generates a carrier wave having a predetermined frequency is connected to the mixer 18. The mixer 18 mixes a signal inputted from the transmission circuit 14 and a carrier wave inputted from the carrier wave generation circuit 20 and modulates the carrier wave inputted from the carrier wave generation circuit 20 with the signal inputted from the transmission circuit 14. Further, the modulated wave is transmitted as a radio wave from the transmission antenna 22.

Connected to the carrier wave generation circuit 20 is the receiving circuit 24 which fetches a data signal from the modulated wave modulated and sent back from the vehicle-mounted apparatus 30 and received by the receiving antenna 26. The receiving circuit 24 is connected to the signal processing circuit 12. Further, the receiving circuit 24 is connected to the carrier wave generation circuit 20 and a carrier wave transmitted for comparison of the carrier wave included in the signal sent back from the vehicle-mounted apparatus 30 is inputted thereto.

Other structures in the mid-route 200 are the same as the above-described ones, and therefore, descriptions thereof will be omitted. Further, respective antennas and antenna control devices at an entrance gate 100 and an exit gate 300 are substantially the same in structure as those referred to the above, and therefore, descriptions thereof will be omitted.

Further, in the above-described vehicle-mounted apparatus and on-road apparatus, an antenna comprised of the transmitting and receiving antennas separated from each other is used. However, a transmission/reception type antenna may be used.

Figure 15:
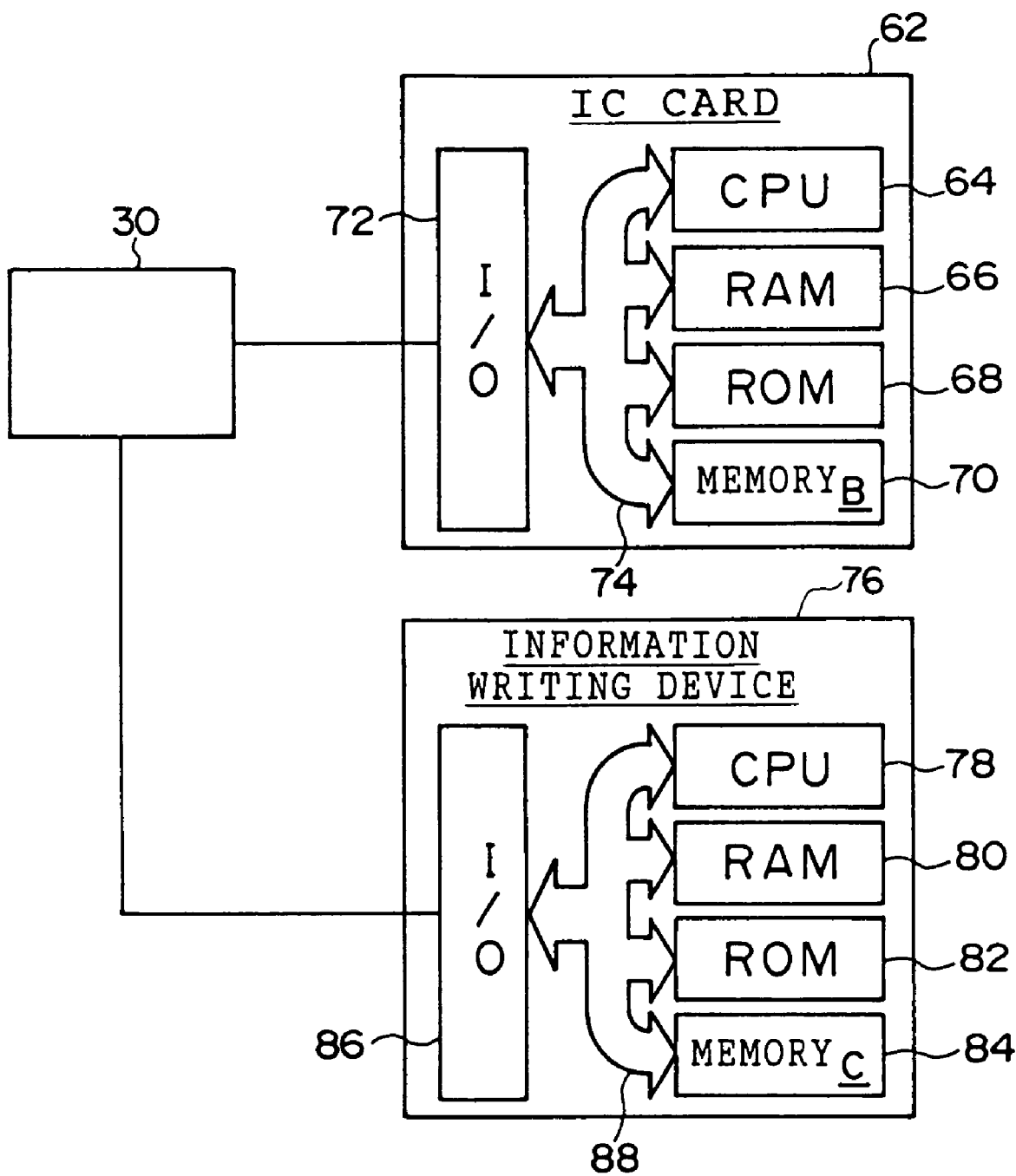
FIG. 15 is a block diagram that shows an IC card and an information writing device of the second embodiment.

As shown in FIG. 15, the IC card 62 which can be inserted in the vehicle-mounted apparatus 30 is comprised of a microcomputer including the CPU 64, the RAM 66, the ROM 68, the memory 70, and the input/output (I/O) port 72, which are connected by the bus 74 so as to allow transfer of a command or data therebetween. The memory 70 is used for storage of the electronic key B and various information. Further, the ROM 68 stores therein a processing routine which will be described later. The input/output port 72 can be connected to the vehicle-mounted apparatus 30 or to the IC read/write device 60. Further, although not illustrated, the IC card 62 is provided with a power source circuit so as to supply a power source constantly.

The above-described IC card can store, as various information, information regarding the vehicle-mounted apparatus such as a card number, balance information, information about utilization details (entrance gate number, exit gate number, toll, date and time of utilization, and the like), and also can store a certified key code for having a card correspond to the vehicle-mounted apparatus, namely, recording the electronic key B.

Further, there can be used, as the IC card, various cards, for example, a memory card such as an LSI card, a magnetic card, a hologram card on which information can be optically recorded and reproduced, or a magneto-optical card on which information can be magneto-optically recorded and reproduced.

The information writing device 76 for writing the information regarding the vehicle-mounted apparatus in the above-described vehicle-mounted apparatus 30 can be connected to the vehicle-mounted apparatus 30 and is comprised of a microcomputer including a CPU 78, a RAM 80, a ROM 82, a memory 84, and an input/output (I/O) port 86, which are connected by a bus 88 so as to allow transfer of a command or data. The memory 84 is used for storage of the electronic key C and various information. The ROM 82 stores therein a processing routine, which will be described later. The input/output port 86 can be connected to the vehicle-mounted apparatus 30.

Next, an operation of the present embodiment will be described.

First, a process for writing vehicle information in the vehicle-mounted apparatus 30 will be described.

Figure 16:
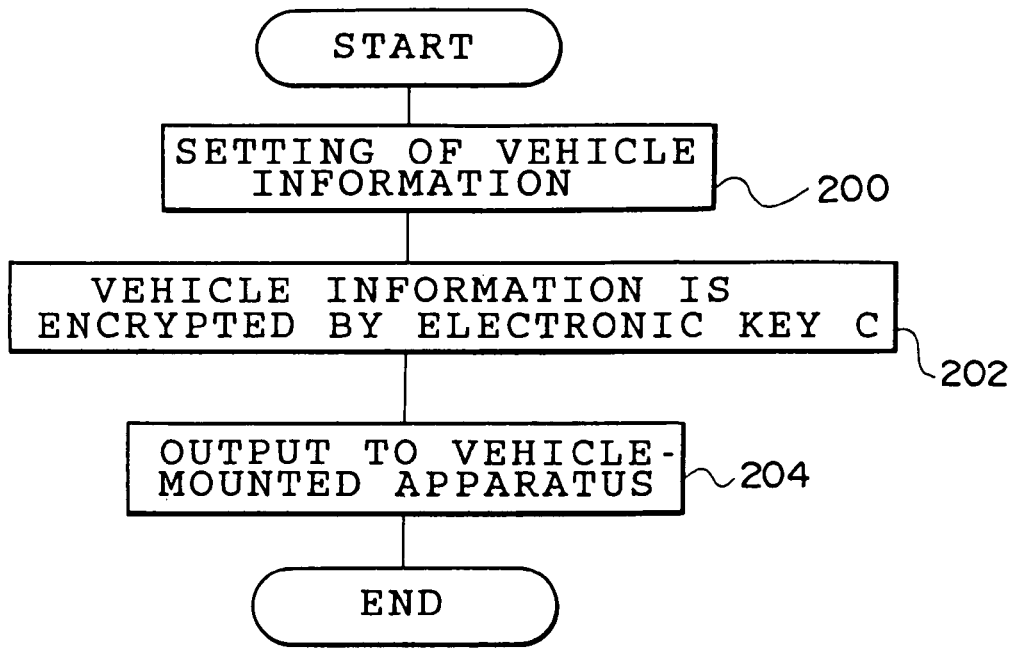
FIG. 16 is a flow chart that shows a process routine of the information writing device of the second embodiment.
Figure 21:
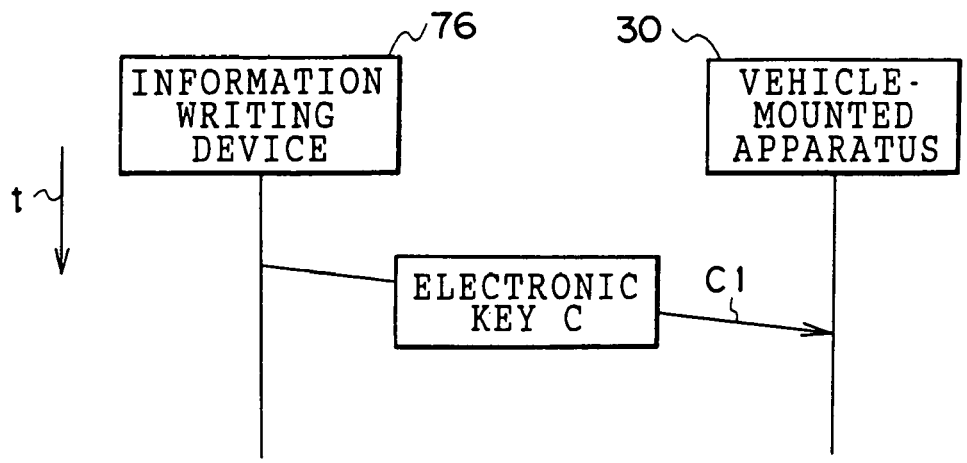
FIG. 21 is an image diagram showing transmitting and receiving of information, which is effected between the information writing device and the vehicle-mounted apparatus of the second embodiment.

FIG. 16 shows a process routine in the information writing device 76 for writing vehicle information in the vehicle-mounted apparatus 30. When the process is executed, in step 200, vehicle information such as the type of vehicle on which the vehicle-mounted apparatus 30 is mounted, an ID number, and the like, which is to be written in the vehicle-mounted apparatus 30, is set. In the subsequent step 202, the electronic key C is read and the set vehicle information is encrypted by the electronic key C. In the subsequent step 204, the encrypted vehicle information is outputted to the vehicle-mounted apparatus 30 (see an output C1 in FIG. 21). The information writing device 76 thus encrypts the vehicle information to be outputted and maintains the secrecy of the information.

Figure 17:
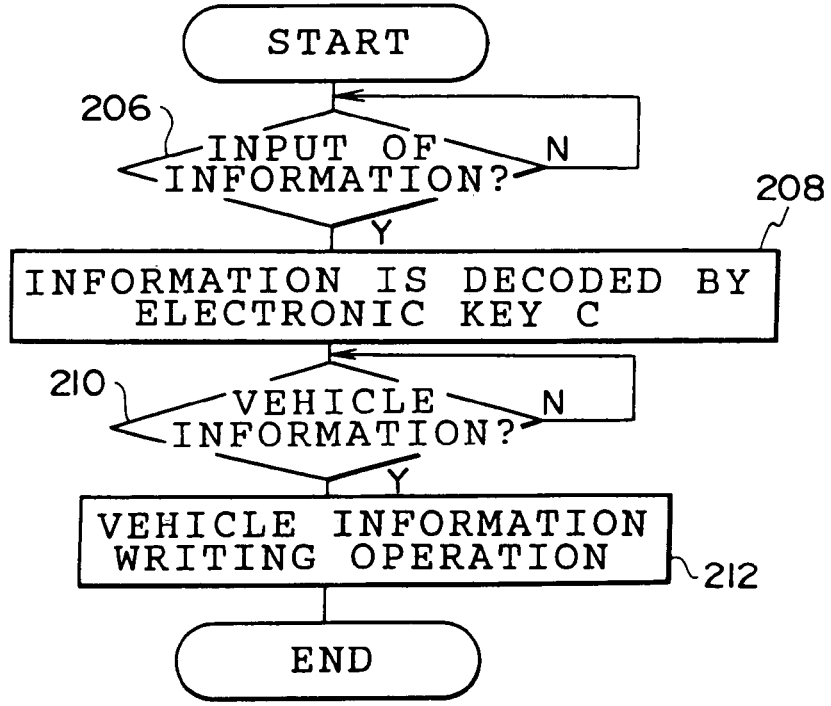
FIG. 17 is a flow chart that shows a process routine of the vehicle-mounted apparatus with respect to the information writing device of the second embodiment.

FIG. 17 shows a process routine of the vehicle-mounted apparatus when the vehicle information is written therein. In step 206, the vehicle-mounted apparatus waits until information is inputted thereto, and when information is inputted, in step 208, the electronic key C is read and the inputted information is decoded by the electronic key C. In the subsequent step 210, it is determined whether the decoded information is the vehicle information. When the decoded information is not the vehicle information, it is determined that other processing is effected or false information is given (when the decision of step 210 is negative), and the present routine ends. On the other hand, when the decoded information is the vehicle information (when the decision of step 210 is affirmative), in step 212, the decoded vehicle information is written in the storage circuit 48. As described above, in the vehicle-mounted apparatus 30, the encrypted information is decoded and it is determined whether the decoded information is the vehicle information. Accordingly, there is no possibility of the inputted information being incorrectly written in the vehicle-mounted apparatus.

Next, intercommunication processing between the on-road apparatus and the vehicle-mounted apparatus will be described.

Figure 18:
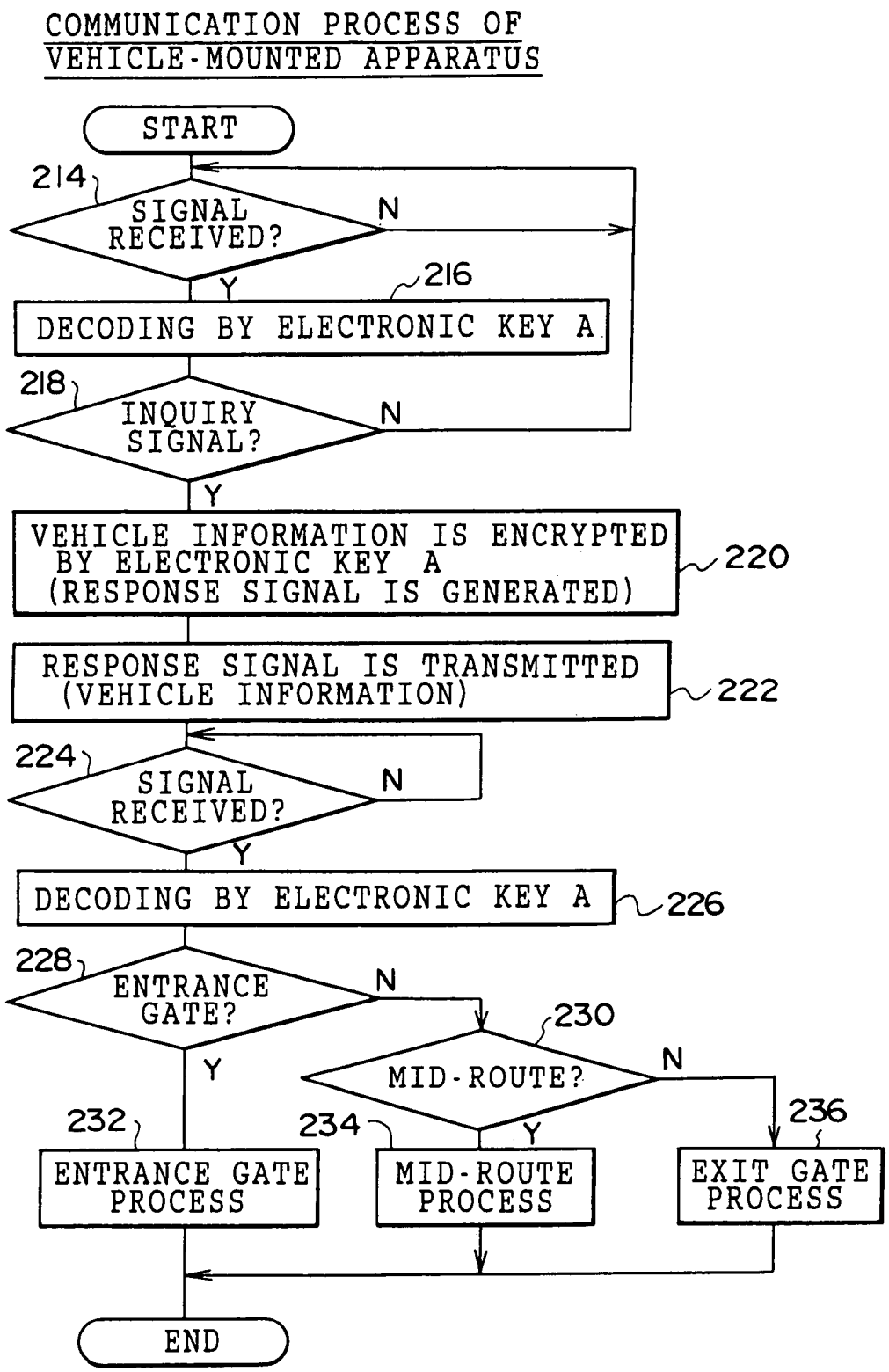
FIG. 18 is a flow chart that shows a communication processing routine of the vehicle-mounted apparatus of the second embodiment.

FIG. 18 shows in detail communication processing of the vehicle-mounted apparatus. In step 214, the vehicle-mounted apparatus waits until it receives a signal from the on-road apparatus (see a transfer A1 in FIG. 23). When the vehicle-mounted apparatus receives the signal (when the decision of step 214 is affirmative), in the subsequent step 216, the electronic key A is read and the received signal is decoded by the electronic key A. In the subsequent step 218, it is determined whether the decoded signal is an inquiry signal. When the decoded signal is not an inquiry signal, the decision of step 218 is negative, and the process returns to step 214. When the decoded signal is an inquiry signal, the decision of the step 218 is affirmative and the process proceeds to step 220.

In step 220, the electronic key A and the vehicle information (for example, an ID code such as an identification code which specifies a vehicle), and the vehicle information is encrypted by the electronic key A. In the subsequent step 222, with the received inquiry signal being used as a carrier wave, a modulated wave wherein the carrier wave is modulated with the encrypted vehicle information is transmitted as an inquiry signal (a transfer A2 in FIG. 23).

Figure 23:
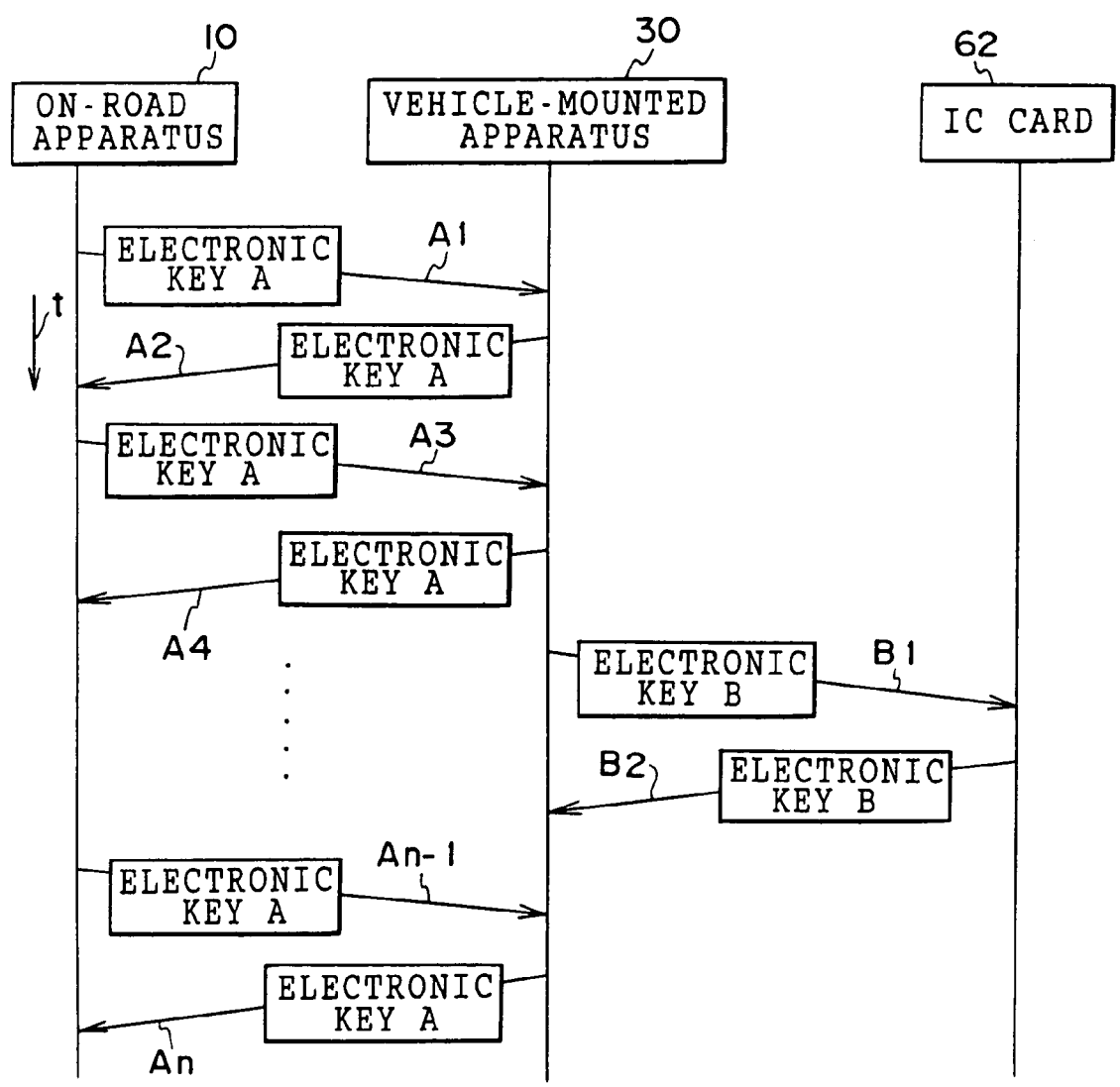
FIG. 23 is an image diagram showing transmitting and receiving of information, which is effected between the on-road apparatus and the vehicle-mounted apparatus and between the IC card read/write device and the vehicle-mounted apparatus in the second embodiment.

Next, in step 224, the vehicle-mounted apparatus waits until it receives a signal from the on-road apparatus (a transfer A3 in FIG. 23). When the vehicle-mounted apparatus receives the signal (when the decision of step 224 is affirmative), in step 226, the received signal is decoded by the electronic key A. In the subsequent step 228, by determining whether the decoded signal includes entrance information, it is determined whether the vehicle is presently passing the entrance gate. When the vehicle is not passing the entrance gate (when the decision of step 228 is negative), the process proceeds to step 230. When the vehicle is passing the entrance gate, in step 232, entrance gate processing (the transfer A4 to An in FIG. 23) is executed. In this entrance gate processing, in step 506, the entrance information which is an entrance gate number included in the received signal is stored in the storage circuit 48 of the vehicle-mounted apparatus 30.

In step 230, based on a determination as to whether the decoded signal includes a mid-route code (check barrier information), it is determined whether the vehicle has passed the mid-route 200. When the vehicle has passed the mid-route 200 (when the decision of step 230 is affirmative), in step 234, mid-route processing is executed. When the vehicle has not passed the mid-route 200 (when the decision of step 230 is negative), it is determined that the vehicle has passed an exit gate, and in step 236, exit gate processing is executed.

In this mid-route processing, mid-route information based on a mid-route code included in the decoded signal is stored in the storage circuit 48 of the vehicle-mounted apparatus 30. Further, in the exit gate processing of step 514, based on information regarding the type of vehicle stored in the vehicle-mounted apparatus, balance information stored in the IC card mounted in the vehicle-mounted apparatus, and a toll table recorded in advance in the vehicle-mounted apparatus, tolls charged on a route from the entrance gate to the exit gate with the mid-route located therebetween are calculated from the present balance, and the charged tolls are automatically collected. After the tolls have been normally collected, entrance information is cleared. In the mid-route processing or in the exit entrance processing, transfer of information indicated by the transfer A4 to An shown in FIG. 23 is carried out in accordance with the number of processes. The transfer of information to the IC card will be described later.

Figure 19:
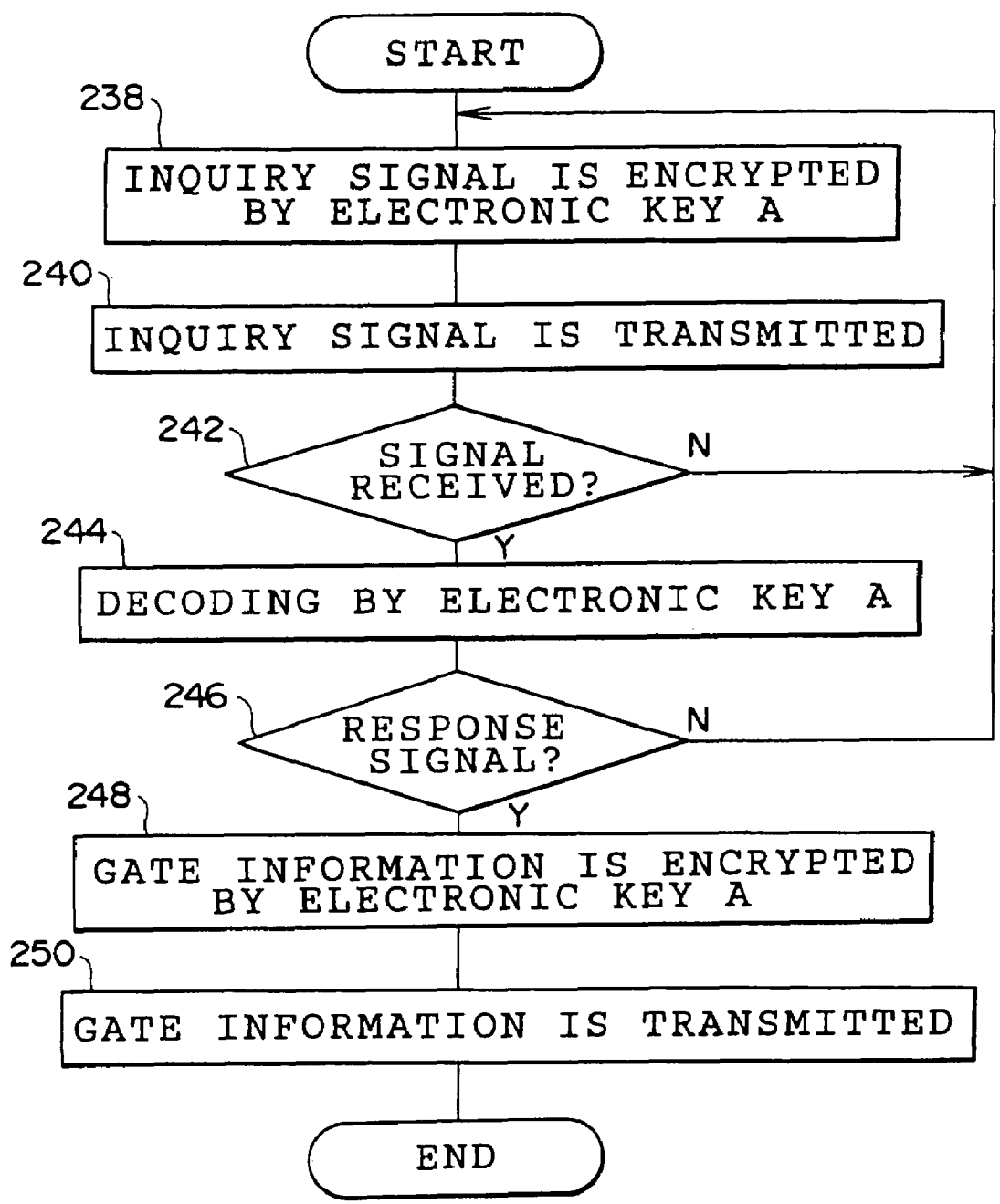
FIG. 19 is a flow chart that shows a process routine of the on-road apparatus of the second embodiment.

As shown in FIG. 19, in step 238, an on-road apparatus located in a mid-route reads the electronic key A and encrypts an inquiry signal by the electronic key A. In the subsequent step 240, the on-road apparatus transmits the encrypted inquiry signal (see the transfer A1 in FIG. 23).

Subsequently, the on-road apparatus transmits the encrypted inquiry signal until it receives the response signal from the vehicle-mounted apparatus 30, and in the subsequent step 242, it is determined whether the on-road apparatus has received the signal from the vehicle-mounted apparatus 30. When the on-road apparatus has received the signal, the decision of step 242 is affirmative, and in the subsequent step 244, the signal is decoded using the electronic key A. When the on-road apparatus has not received the signal (when the decision of step 242 is negative), the process returns to step 238.

In the subsequent step 246, it is determined whether the decoded signal is a response signal. When it is the response signal (when the decision of step 246 is affirmative), in step 248, gate information, in this case, mid-route information is encrypted using the electronic key A. In the subsequent step 250, the on-road apparatus transmits a signal including the encrypted mid-route information and the like (see the transfer A3 in FIG. 23).

Meanwhile, in the on-road apparatus at the entrance gate, substantially the same process as the above-described one is executed, but the on-road apparatus transmits, in place of the signal including the mid-route information and the like, a signal including an entrance gate number, which represents the entrance gate, and the like. Further, in the on-road apparatus at the exit gate 300 as well, substantially the same process as the above-described one is executed, but the toll receiving processing may be executed by a signal including an exit code representing an exit gate, and the like or by radio communications.

In the transfer of a signal between the above-described on-road apparatus 10 and the vehicle-mounted apparatus 30, information is decoded by the electronic key A. Accordingly, the information transferred between the on-road apparatus 10 and the vehicle-mounted apparatus 30 maintains secrecy, and the security to the interception of information can be improved.

Next, a process for the transfer of information between the IC card 62 and the vehicle-mounted apparatus 30 will be described. In the following, processing in the IC card read/write device 60 connected to the vehicle-mounted apparatus 30 will be described, and the present invention can also be applied to a case in which an IC card read/write device is independently located at a recovery gate or the like.

Figure 20:
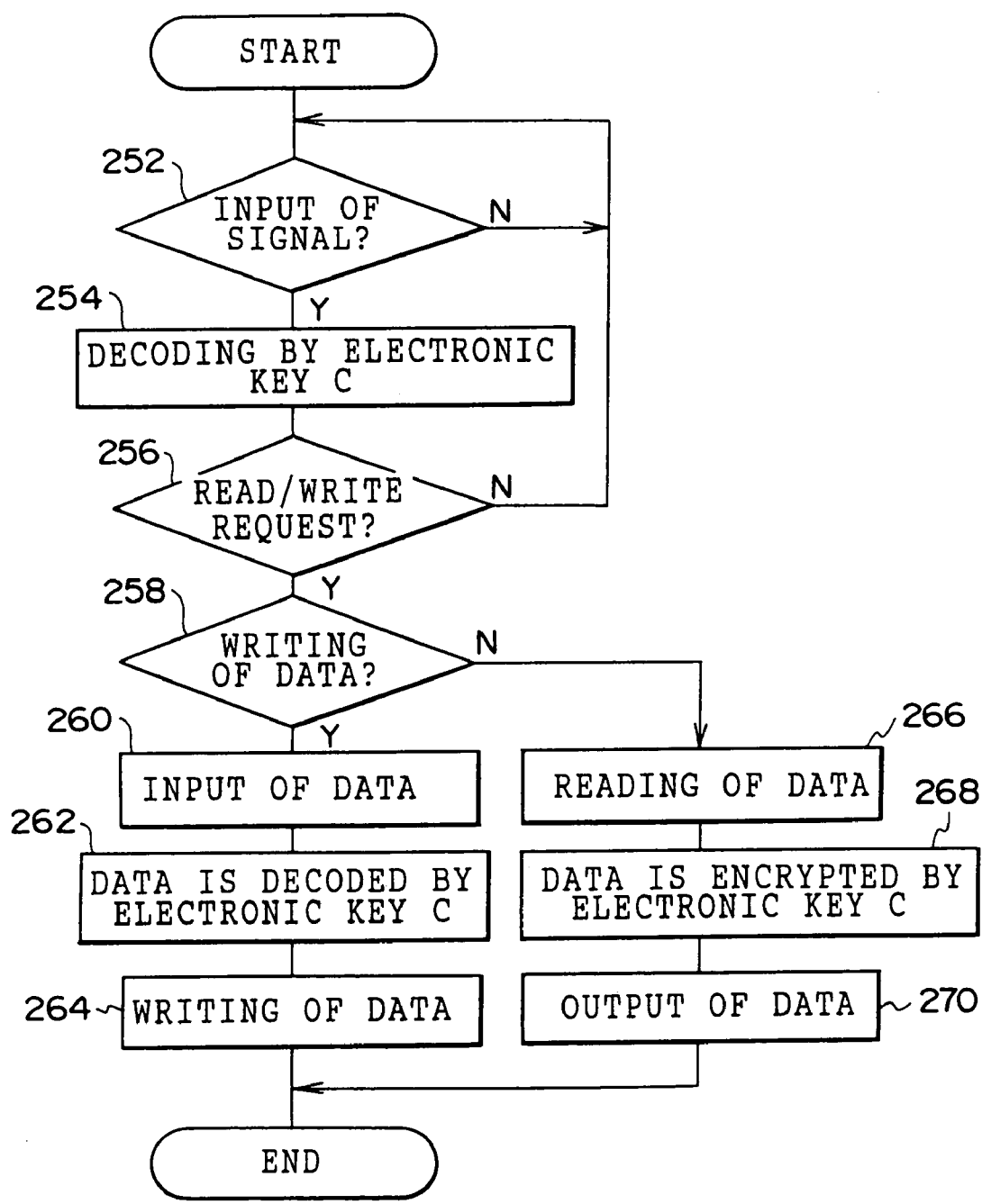
FIG. 20 is a flow chart that shows a process routine of the IC card of the second embodiment.
Figure 22:
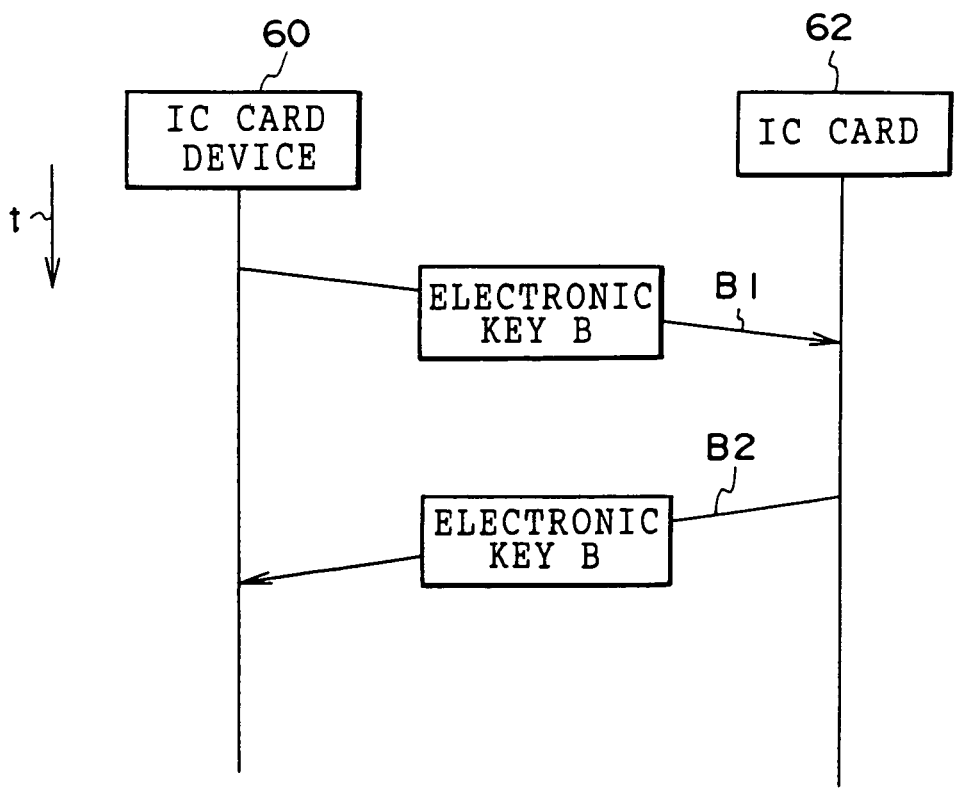
FIG. 22 is an image diagram showing transmitting and receiving of information, which is effected between an IC card read/write device and the vehicle-mounted apparatus of the second embodiment.

FIG. 20 shows a process in the IC card 62. In step 252, it is determined whether a signal is inputted from the vehicle-mounted apparatus 30. When a signal is not inputted, the decision of step 252 is negative and the decision of step 252 is made repeatedly. On the other hand, when a signal is inputted (see a transfer B1 in FIG. 22 and the transfer B1 in FIG. 23), the decision of step 252 is affirmative, and in step 254, the IC card reads the electronic key B and decodes the inputted signal by the electronic key B. In the subsequent step 256, it is determined whether the decoded signal is a read/write request given to the IC card 62. When the inputted signal is a request other than the read/write request, the decision of step 256 is negative, and the process returns to step 252. On the other hand, when the process effected for the IC card 62 is the request for reading and writing, the decision of step 256 is affirmative. In the subsequent step 258, it is determined whether the request is that for writing. When the request is that for writing data, the decision of step 258 is affirmative, and the process proceeds to step 260, and when the request is that for reading data, the decision of step 258 is negative, and the process proceeds to step 266.

In step 260, a request for output of data is given to the vehicle-mounted apparatus 30 (see a transfer B2 in FIG. 22 and a transfer B2 in FIG. 23), and the data is inputted to the IC card. The inputted data is decoded in step 262 and the decoded data is written in the memory 70 in step 264.

In step 266, the data stored in the memory 70 is read, and in the subsequent step 268, the data is encrypted by the electronic key B. In step 270, the data is outputted to the vehicle-mounted apparatus 30 (see the transfer B2 in FIG. 22 and the transfer B2 in FIG. 23).

Accordingly, the information transferred between the vehicle-mounted apparatus and the IC card is allowed to maintain secrecy so as to improve the security with respect to the interception of the information.

As described above, in the present embodiment, at the time of communication of information between the on-road apparatus and the vehicle-mounted apparatus and in the transfer of information between the vehicle-mounted apparatus and the IC card or between the vehicle-mounted apparatus and the information writing device, the information is encrypted or decoded using different electronic keys. For this reason, even when the secrecy of one electronic key leaks out, disclosure of the secrecy of a system can be kept to a minimum. Accordingly, the reliability of data held by each system can be improved and the load of each system can be reduced by the secrecy which is based on a small number of electronic keys.

Meanwhile, the above-described system can be applied to a toll road of a simple toll collecting system, or a parking area, wherein a gate is not present. For this reason, this system can be used only for reception of tolls or transfer of simple information such as parking time, time for passage, and the like, and the system of the present embodiment can easily be applied.

The above-described process routine may be executed using a floppy disk (FD) serving as a recording medium without being stored in a memory or ROM of each of the on-road apparatus and the vehicle-mounted apparatus. In this case, in the on-road apparatus, a floppy disk unit (FDU) in which a floppy disk can be removably inserted may be connected to an input/output port of the signal processing circuit 12 or the like, and in the vehicle-mounted apparatus, a floppy disk unit (FDU) in which a floppy disk can be removably inserted may be connected to an input/output port of the signal processing circuit 46 or the like. As a result, the above-described process routine or the like can be read out and written in a floppy disk using the FDU, and a program can be recorded in advance in the floppy disk without being stored in a ROM or the like, and the processing program recorded in the floppy disk via the FDU can be executed. Further, in place of the FDU, a mass storage (not shown) such as a hard disk device is connected to the input/output port and the processing program recorded in the floppy disk may be executed by being stored (installed) in the mass storage (not shown). Further, as the recording medium, an optical disk such as a CD-ROM, or a photo-magnetic disk such as an MD, MO, or the like is provided. When these disks are used, a CD-ROM device, an MD device, an MO device, or the like may be used in place of or in addition to the above-described FDU.

INDUSTRIAL APPLICABILITY

As described above, the vehicle-mounted communication device and road-to-vehicle communication device according to the present invention are suitably used for the vehicle-mounted communication device mounted on a vehicle and for the road-to-vehicle communication device in which communication processing is effected between the vehicle-mounted communication device and an on-road apparatus located on the road side, and are, for example, applied to an automatic toll receiving system for automatically receiving a toll for a vehicle running on a toll road or the like or a vehicle parked in a toll parking area.

What is claimed is:

1. A vehicle-mounted communication device comprising:
   transmitting/receiving means provided for wireless communication of information with road-side communication means located at a road side;
   relay means that relays encryption information, received from the road side by said transmitting/receiving means, to an IC card and that relays output information encrypted by the IC card to the transmitting/receiving means, in an undecoded state, the IC card includes a) storage means that stores user information regarding a user for charge-processing, b) encryption means that encrypts the output information which is based on the user information and outputs the encrypted output information, and that decodes encrypted input information relating to the user information, and c) output means that transmits a portion of the output information in a state without being encrypted;
   information display means that displays information; and
   encryption information storage means in which the encryption information is temporarily stored,
   wherein the transmitting/receiving means stores the encryption information in the encryption information storage means and transmits the encryption information stored in the encryption information storage means as it is, and
   the information display means receives and displays the portion of the output information, which is output from the output means in the state without being encrypted.

2. A road-to-vehicle communication device comprising:
   a vehicle-mounted communication device according to claim 1; and
   road-side control means being located at a road side, including road-side communication means provided for intercommunication of information with the vehicle-mounted communication device, and also including road-side encryption means for encrypting transmitted information and decoding received information.

3. A road-to-vehicle communication device according to claim 2, wherein road-side encryption means of said road-side control means installed at an entrance gate effects encryption of transmitted information and road-side encryption means of said road-side control means installed at a toll reception gate effects only decoding of received information.

4. A road-to-vehicle communication device according to claim 2, wherein the transmitted information is accounting information regarding accounting processing of charged facilities.

5. A road-to-vehicle communication device according to claim 3, wherein the transmitted information is accounting information regarding accounting processing of charged facilities.

6. A vehicle-mounted communication device according to claim 1, wherein the encryption information is temporarily stored in the vehicle-mounted communication device in an undecoded state.

7. A vehicle-mounted communication device according to claim 1, wherein the road-side communication means further transmits non-encrypted information, and the information display means receives and displays the non-encrypted information.

* * * * *